United States Patent
Kitamura et al.

(10) Patent No.: US 10,464,593 B2
(45) Date of Patent: Nov. 5, 2019

(54) POWER STEERING APPARATUS AND METHOD OF MANUFACTURING POWER STEERING APPARATUS

(71) Applicant: HITACHI AUTOMOTIVE SYSTEMS, LTD., Hitachinaka-shi, Ibaraki (JP)

(72) Inventors: Keisuke Kitamura, Atsugi (JP); Tatsuyoshi Maruyama, Atsugi (JP); Hiroyuki Sugiyama, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 314 days.

(21) Appl. No.: 15/118,137

(22) PCT Filed: Feb. 16, 2015

(86) PCT No.: PCT/JP2015/054127
§ 371 (c)(1),
(2) Date: Aug. 11, 2016

(87) PCT Pub. No.: WO2015/129502
PCT Pub. Date: Sep. 3, 2015

(65) Prior Publication Data
US 2017/0174253 A1    Jun. 22, 2017

(30) Foreign Application Priority Data

Feb. 27, 2014    (JP) .................................. 2014-036211

(51) Int. Cl.
*B62D 5/04*    (2006.01)
*B62D 3/08*    (2006.01)
(Continued)

(52) U.S. Cl.
CPC .............. *B62D 5/0448* (2013.01); *B23C 3/32* (2013.01); *B62D 3/08* (2013.01); *B62D 5/04* (2013.01);
(Continued)

(58) Field of Classification Search
CPC ...... F16H 25/2214; B62D 5/0448; B62D 3/08
See application file for complete search history.

(56) References Cited

U.S. PATENT DOCUMENTS 2,882,742 A * 4/1959 Conant ............... F16H 25/2214
74/424.87
3,046,808 A * 7/1962 De Mart ............. F16H 25/2204
254/103
(Continued)

FOREIGN PATENT DOCUMENTS

JP        02-124353 U    10/1990
JP        04-116051 U    10/1992
(Continued)

*Primary Examiner* — Joseph M Rocca
*Assistant Examiner* — Maurice L Williams
(74) *Attorney, Agent, or Firm* — Foley & Lardner LLP

(57) ABSTRACT

An object of the present invention is to provide a power steering apparatus and a method of manufacturing a power steering apparatus that allow balls to smoothly travel in a connection member for circulating the balls. To achieve this object, a first curved portion of a first connection passage of a nut that faces a first bent portion of the connection member is formed into a curved shape in such a manner that a space between the first curved portion and the first bent portion is equal to or smaller than a predetermined value. Further, a second curved portion of a second connection passage of the nut that faces a second bent portion of the connection member is formed into a curved shape in such a manner that (Continued)

a space between the second curved portion and the second bent portion is equal to or smaller than a predetermined value.

11 Claims, 16 Drawing Sheets

(51) Int. Cl.
  *F16H 25/22* (2006.01)
  *B23C 3/32* (2006.01)
  *F16H 25/20* (2006.01)
(52) U.S. Cl.
  CPC ...... *F16H 25/2214* (2013.01); *B23C 2215/08* (2013.01); *F16H 2025/2096* (2013.01)

(56) References Cited

U.S. PATENT DOCUMENTS

| | | | | |
|---|---|---|---|---|
| 3,206,995 A * | 9/1965 | Bohnhoff | ............ | F16H 25/2214 74/424.87 |
| 3,971,264 A * | 7/1976 | Detraz | ................ | F16H 25/2214 74/424.87 |
| RE32,222 E * | 8/1986 | Drutchas | .............. | B62D 5/0427 180/444 |
| 4,604,911 A | 8/1986 | Teramachi | | |
| 4,750,378 A * | 6/1988 | Sheppard | ................ | B62D 5/24 74/424.87 |
| 5,373,755 A * | 12/1994 | Rohlinger | ........... | F16H 25/2214 74/424.86 |
| 5,809,838 A * | 9/1998 | Miyaguchi | .......... | F16H 25/2214 74/89.44 |
| 6,282,971 B1 * | 9/2001 | Shirai | ................. | F16H 25/2214 74/424.87 |
| 6,450,055 B1 * | 9/2002 | Sekiya | ................ | F16H 25/2214 74/424.87 |
| 6,978,693 B2 * | 12/2005 | Ohkubo | .............. | F16H 25/2214 74/424.75 |
| 2002/0023513 A1 * | 2/2002 | Sekiya | ................ | F16H 25/2214 74/424.87 |
| 2003/0015053 A1 * | 1/2003 | Watanabe | .......... | F16H 25/2214 74/424.86 |
| 2003/0196504 A1 * | 10/2003 | Watanabe | .......... | F16H 25/2214 74/424.86 |
| 2003/0213323 A1 * | 11/2003 | Hayashi | .............. | F16H 25/2214 74/424.87 |
| 2007/0006676 A1 * | 1/2007 | Mizuhara | ............ | B62D 5/0448 74/424.86 |
| 2008/0127763 A1 * | 6/2008 | Minakuti | ............ | F16H 25/2214 74/424.87 |
| 2008/0127764 A1 * | 6/2008 | Takahashi | ........... | F16H 25/2214 74/424.87 |
| 2010/0101349 A1 * | 4/2010 | Kuo | ..................... | F16H 25/2214 74/424.86 |
| 2011/0048151 A1 * | 3/2011 | Liu | ..................... | F16H 25/2214 74/424.86 |
| 2011/0296939 A1 | 12/2011 | Kaneko et al. | | |
| 2012/0103121 A1 * | 5/2012 | Kuo | ..................... | F16H 25/2214 74/424.86 |
| 2012/0304793 A1 * | 12/2012 | Chen | ................... | F16H 25/2214 74/424.88 |
| 2015/0152946 A1 * | 6/2015 | Piltz | .................... | F16H 25/2214 74/424.87 |

FOREIGN PATENT DOCUMENTS

| | | | | |
|---|---|---|---|---|
| JP | 2009-257374 A | 11/2009 | | |
| JP | 2011-256901 A | 12/2011 | | |
| WO | WO-2011077622 A1 * | 6/2011 | ......... | F16H 25/2214 |
| WO | WO-2012032871 A1 * | 3/2012 | ......... | F16H 25/2214 |
| WO | WO-2013112597 A1 * | 8/2013 | ......... | F16H 25/2214 |

\* cited by examiner

A-A

Fig. 22
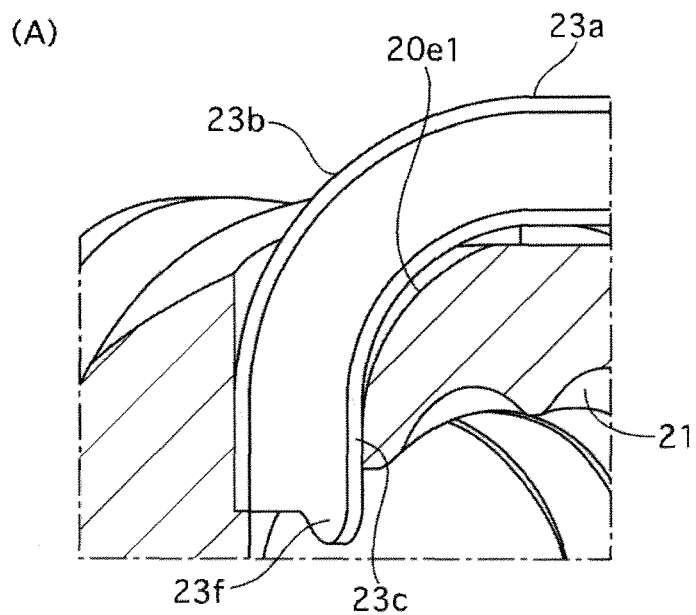
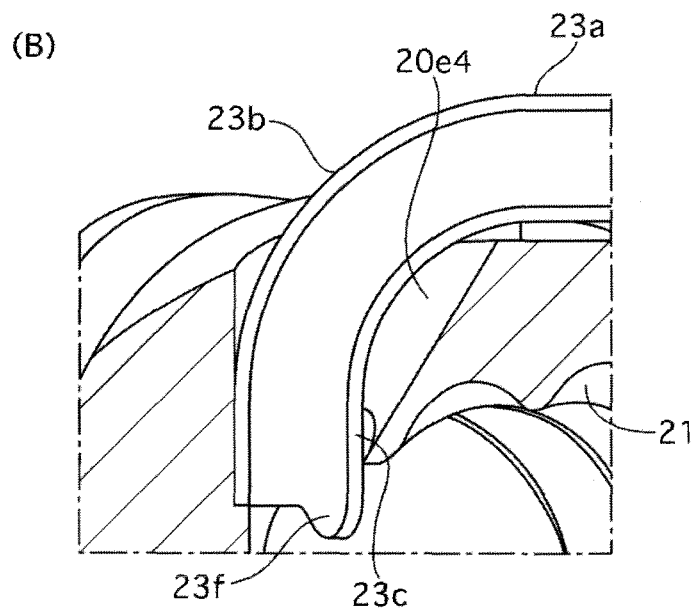

POWER STEERING APPARATUS AND METHOD OF MANUFACTURING POWER STEERING APPARATUS

TECHNICAL FIELD

The present invention relates to a power steering apparatus and a method of manufacturing a power steering apparatus.

BACKGROUND ART

As this type of technique, there is disclosed a technique discussed in the following patent literature, PTL 1. PTL 1 discloses a ball screw apparatus including a returning way formed therein for circulating balls of the ball screw apparatus.

CITATION LIST

Patent Literature

PTL 1: Japanese Patent Application Public Disclosure No. 2011-256901

SUMMARY OF INVENTION

Technical Problem

In the technique discussed in PTL 1, the returning way is formed in such a manner that an inner peripheral side of a corner thereof is bent at an approximately right angle, which may cause the balls to be stuck at the corner of the returning way, thereby prohibiting smooth movements of the balls.

The present invention has been made focusing on the above-described problem, and an object thereof is to provide a power steering apparatus and a method of manufacturing a power steering apparatus that allow the balls to smoothly travel in a connection member for circulating the balls.

Solution to Problem

To achieve the above-described object, in a power steering apparatus according to one aspect of the present invention, a first curved portion of a first connection passage of a nut that faces a first bent portion of a connection member is formed into a curved shape in such a manner that a space between the first curved portion and the first bent portion is equal to or smaller than a predetermined value. Further, a second curved portion of a second connection passage of the nut that faces a second bent portion of the connection member is formed into a curved shape in such a manner that a space between the second curved portion and the second bent portion is equal to or smaller than a predetermined value.

Advantageous Effects of Invention

Therefore, the present invention can allow the balls to smoothly travel in the connection member.

BRIEF DESCRIPTION OF DRAWINGS

FIG. 22 is an enlarged cross-sectional view of the first connection passages according to the first embodiment and the comparison example.

DESCRIPTION OF EMBODIMENTS

First Embodiment

A power steering apparatus 1 according to a first embodiment will be described. The power steering apparatus 1 according to the first embodiment functions to apply an assist force for assisting a steering force input from a driver by transmitting a driving force of an electric motor 40 to a wheel turning shaft 10 via a screw mechanism 26.

[Configuration of Power Steering Apparatus]

Figure 1:
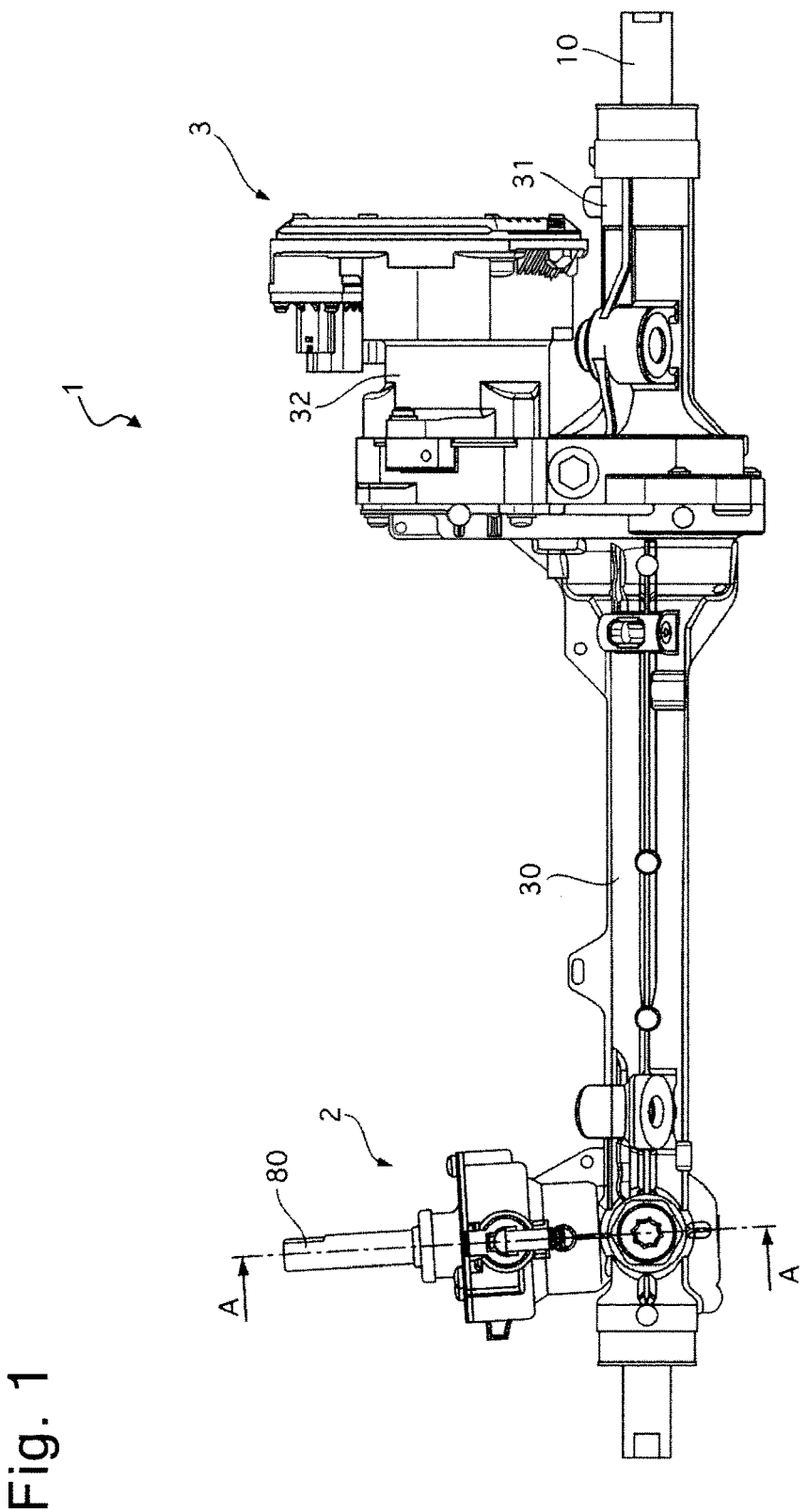
FIG. 1 is a front view of a power steering apparatus according to a first embodiment.
Figure 2:
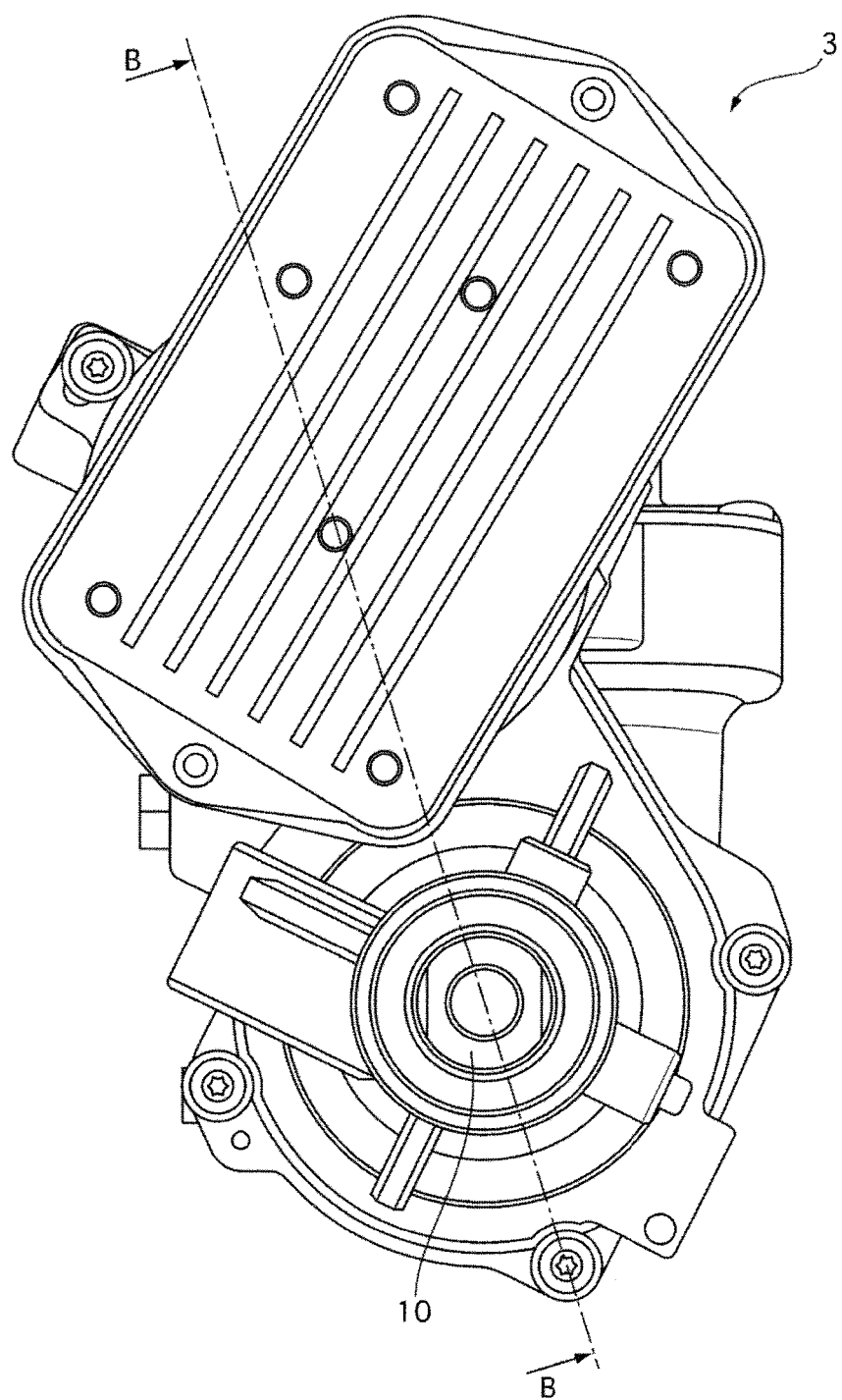
FIG. 2 illustrates the power steering apparatus according to the first embodiment as viewed from an axial direction.
Figure 3:
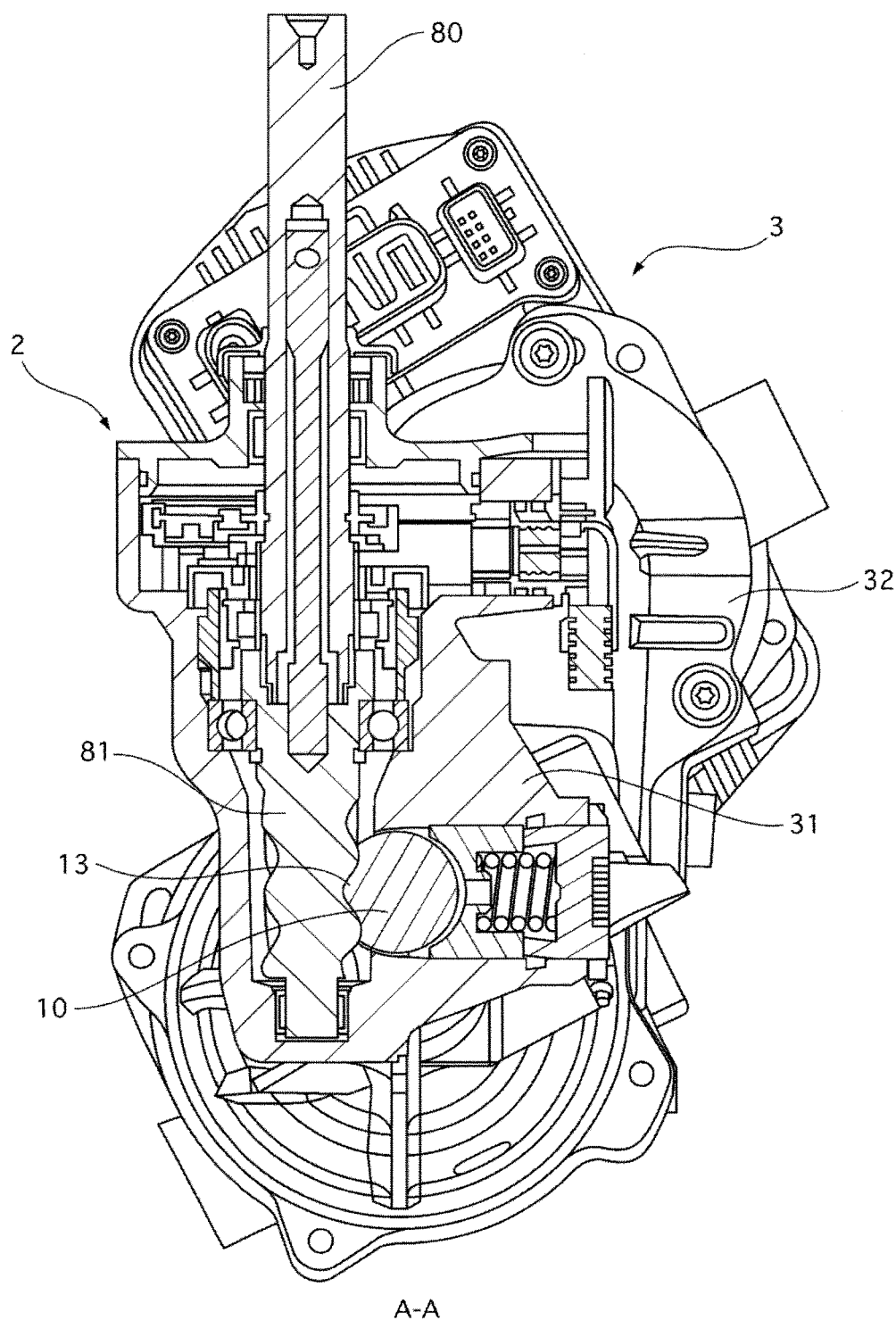
FIG. 3 is a cross-sectional view of the power steering apparatus according to the first embodiment.
Figure 4:
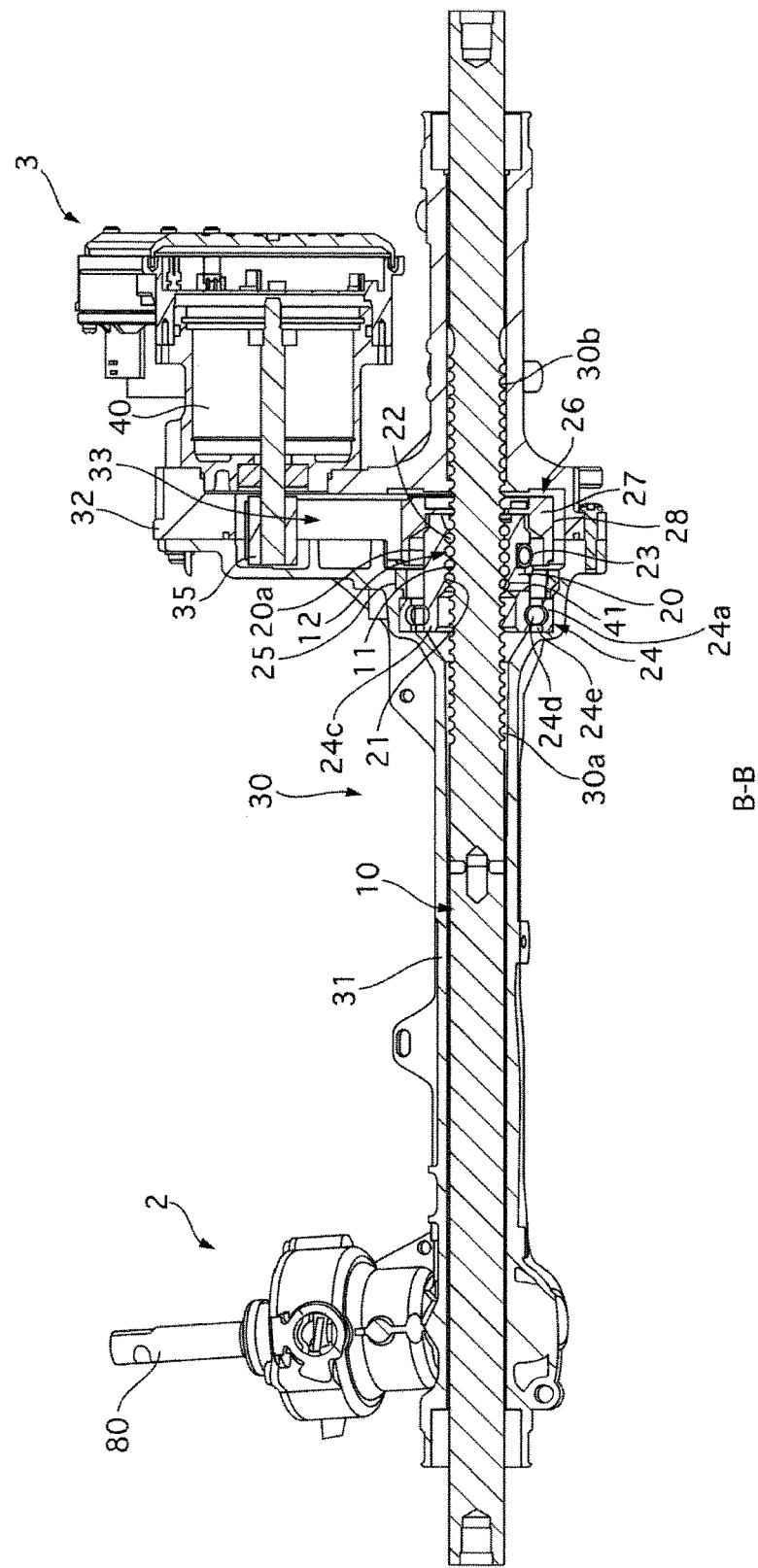
FIG. 4 is a cross-sectional view of the power steering apparatus according to the first embodiment.
Figure 5:
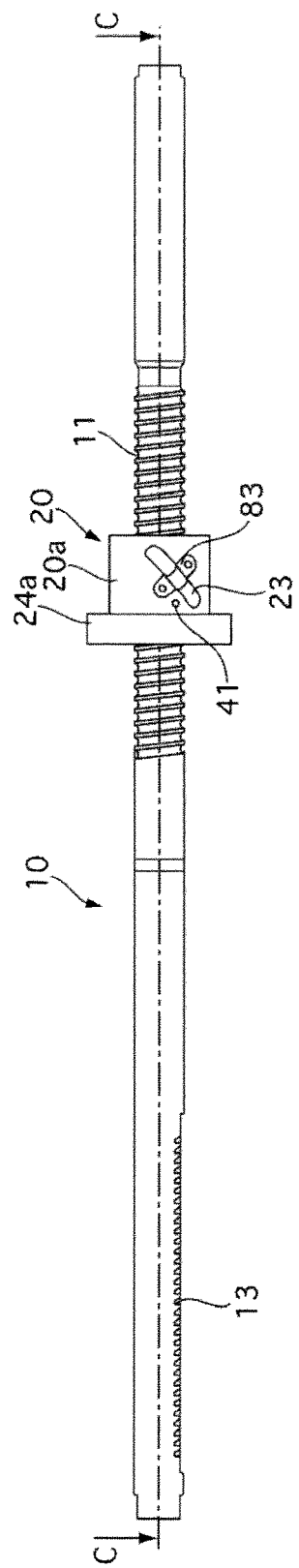
FIG. 5 is a front view of a wheel turning shaft and a nut according to the first embodiment.
Figure 6:
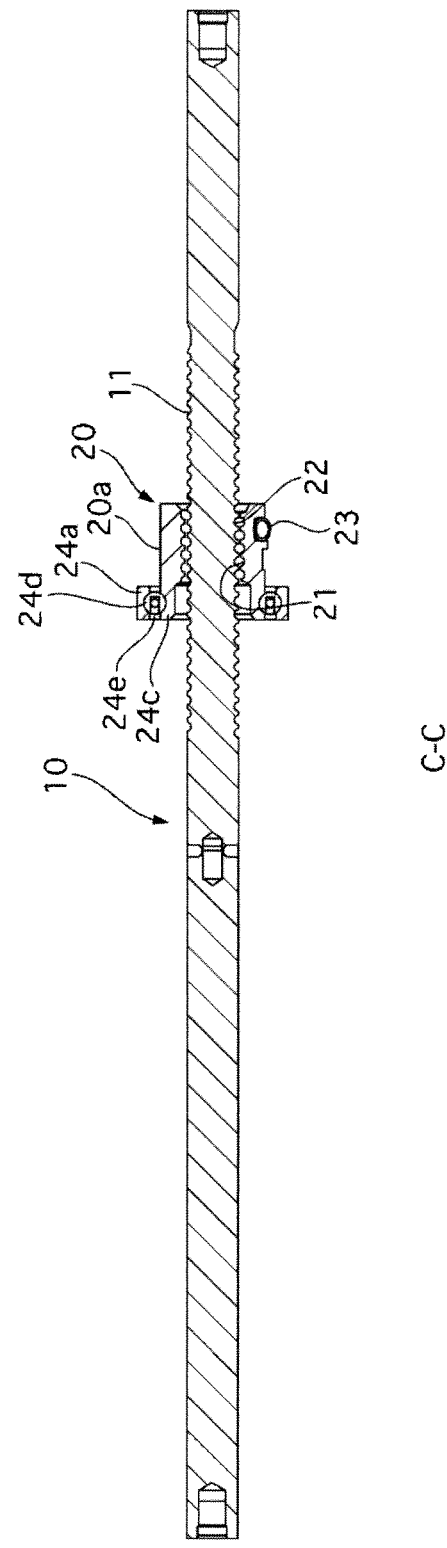
FIG. 6 is a cross-sectional view of the wheel turning shaft and the nut according to the first embodiment.

FIG. 1 is a front view of the power steering apparatus 1. FIG. 2 illustrates the power steering apparatus 1 as viewed from an axial direction. FIG. 3 is a cross-sectional view of FIG. 1 taken along a line A-A. FIG. 4 is a cross-sectional view of FIG. 2 taken along a line B-B. FIG. 5 is a front view of the wheel turning shaft 10 and a nut 20. FIG. 6 is a cross-sectional view of FIG. 5 taken along a line C-C.

The power steering apparatus 1 includes a steering mechanism 2 and an assist mechanism 3. The steering mechanism 2 transmits a rotation of a steering wheel steered by the driver to the wheel turning shaft 10, which turns a turning target wheel. The assist mechanism 3 applies the assist force to the wheel turning shaft 10.

Each of components of the power steering apparatus 1 is contained in a housing 30. The housing 30 includes a wheel turning shaft containing portion 31 and a speed reducer containing portion 32. The wheel turning shaft containing portion 31 contains the wheel turning shaft 10 axially movably. The speed reducer containing portion 32 is provided at an axially intermediate portion of the wheel turning shaft containing portion 31, and is formed so as to surround the wheel turning shaft 10. The speed reducer containing portion 32 contains a speed reducer 33, which will be described below.

The steering mechanism 2 includes a steering input shaft 80 and a pinion 81. The steering input shaft 80 is coupled to the steering wheel. The pinion 81 rotates integrally with the steering input shaft 80. The pinion 81 is meshed with a rack 13 formed on an outer periphery of the wheel turning shaft 10.

The assist mechanism 3 includes the electric motor 40 and the screw mechanism 26. The screw mechanism 26 transmits an output of the electric motor 40 to the wheel turning shaft 10. The output of the electric motor 40 is controlled by a motor controller according to a steering torque and a steering amount input from the driver to the steering wheel. The screw mechanism 26 includes the nut 20 and an output pulley 27. An outer appearance of the output pulley 27 is a cylindrical member, and the output pulley 27 is integrally rotatably fixed to the nut 20. A cylindrical input pulley 35 is integrally rotatably fixed to a driving shaft of the electric motor 40. A belt 28 is wound between the output pulley 27 and the input pulley 35. The speed reducer 33 is formed by the input pulley 35, the output pulley 27, and the belt 28.

The nut 20 is formed annularly so as to surround the wheel turning shaft 10, and is provided rotatably relative to the wheel turning shaft 10. A groove is helically formed on an inner periphery of the nut 20, and this groove forms a nut-side ball screw groove 21. A helical groove is formed on the outer periphery of the wheel turning shaft 10 at a position axially spaced apart from a portion where the above-described rack 13 is formed, and this groove forms a wheel turning shaft-side ball screw groove 11. A ball circulation groove 12 is formed by the nut-side ball screw groove 21 and the wheel turning shaft-side ball screw groove 11 with the wheel turning shaft 10 inserted through the nut 20. A plurality of metallic balls 22 is loaded in the ball circulation groove 12. A rotation of the nut 20 causes the balls 22 to travel in the ball circulation groove 12, and this travel causes the wheel turning shaft 10 to be longitudinally displaced relative to the nut 20.

[Configuration of Nut]

Figure 7:
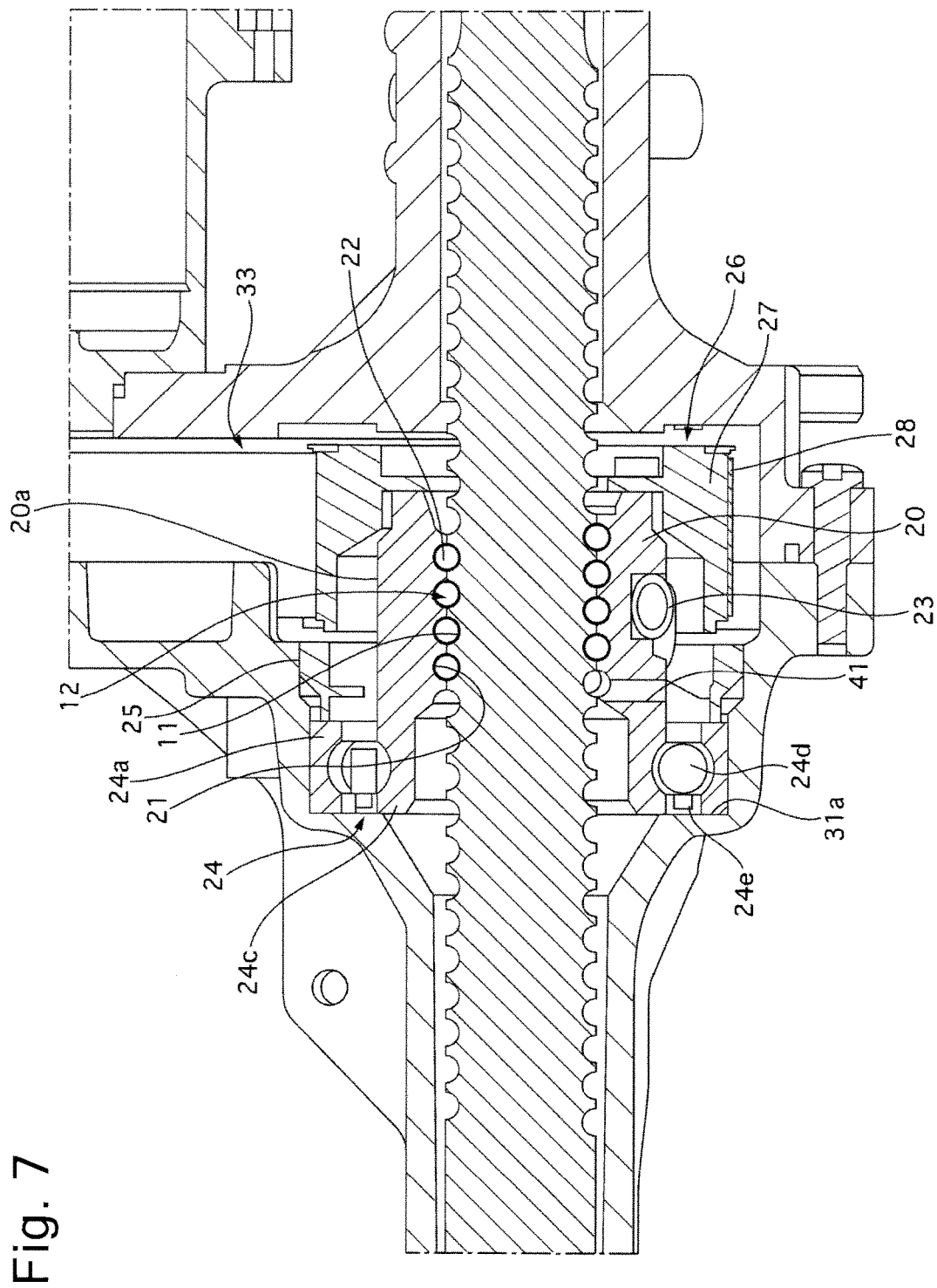
FIG. 7 is an enlarged cross-sectional view of an assist mechanism of the power steering apparatus and a vicinity thereof according to the first embodiment.
Figure 8:
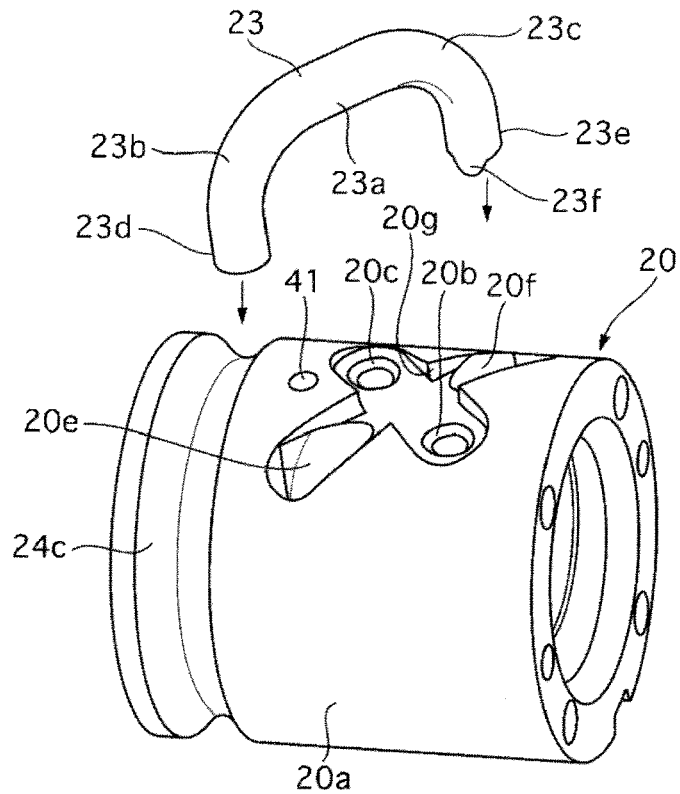
FIG. 8 is a perspective view of the nut according to the first embodiment.
Figure 9:
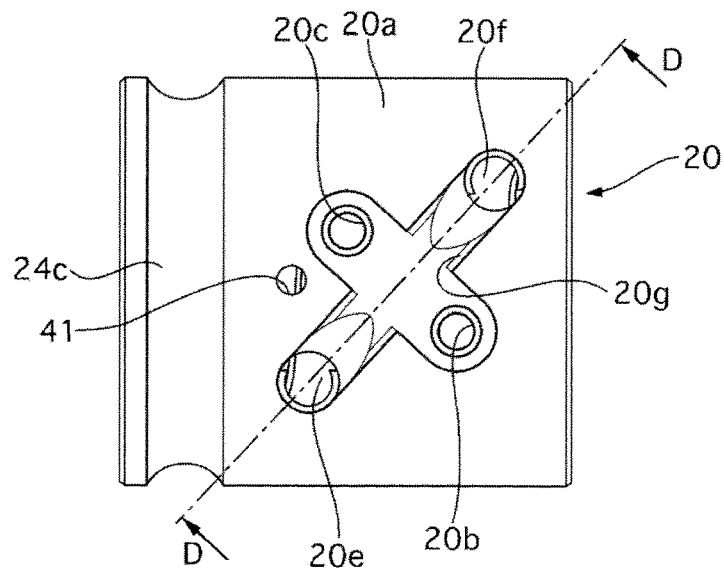
FIG. 9 illustrates the nut according to the first embodiment as viewed from an outer side in a radial direction.
Figure 10:
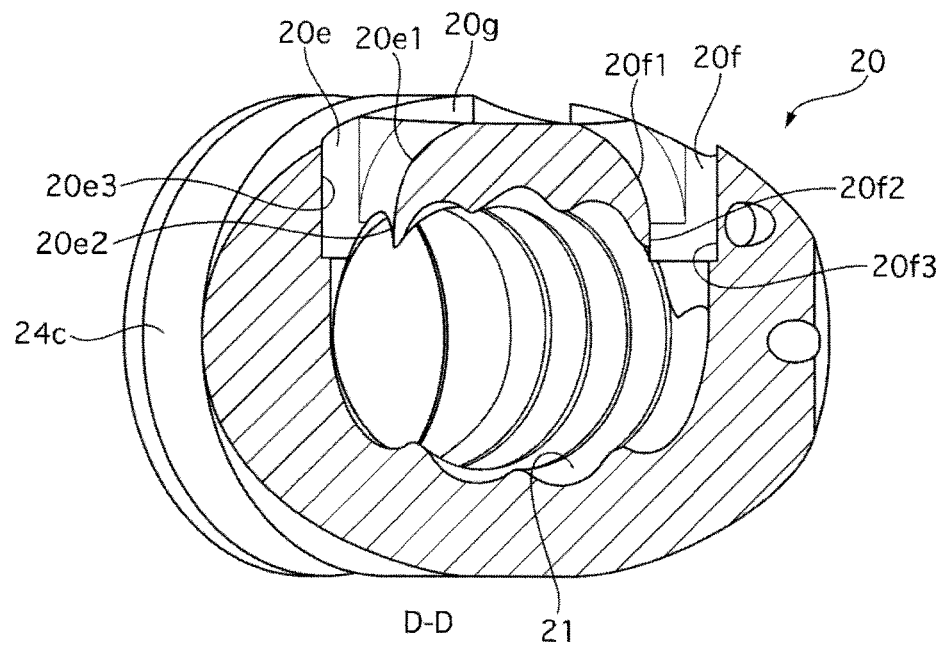
FIG. 10 is a cross-sectional view of the nut according to the first embodiment.
Figure 11:
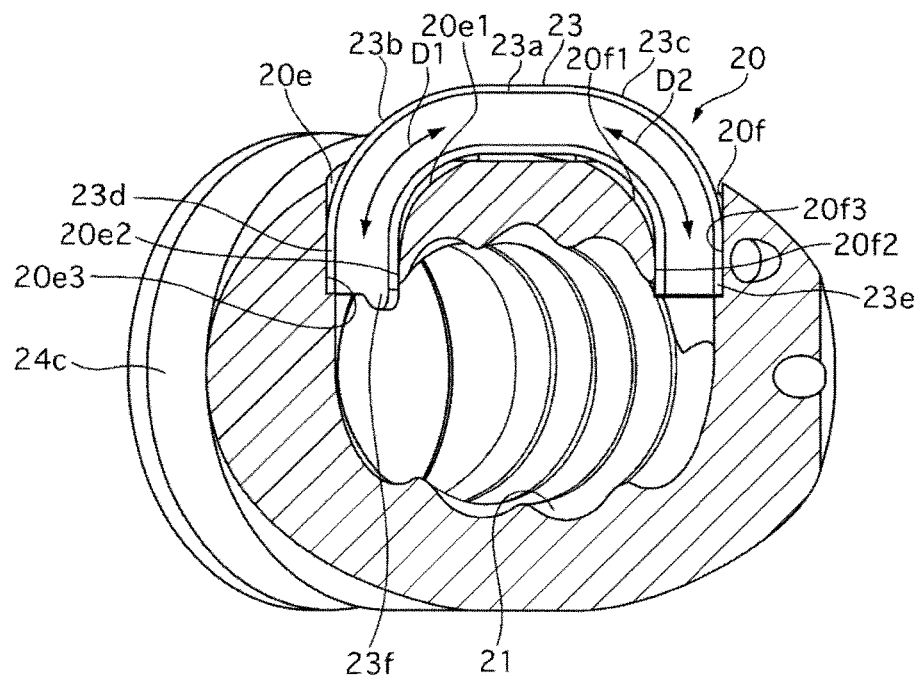
FIG. 11 is a cross-sectional view of the nut according to the first embodiment.

FIG. 7 is an enlarged cross-sectional view of the assist mechanism 3 of the power steering apparatus 1, and a vicinity thereof. FIG. 8 is a perspective view of the nut 20. FIG. 9 illustrates the nut 20 as viewed from an outer side in a radial direction. FIG. 10 is a cross-sectional view of FIG. 9 taken along a line D-D. FIG. 11 is a cross-sectional view of the nut 20 with a connection member 23 mounted thereon.

An inner race 24c of a bearing 24 is integrally formed on one axial end side of the nut 20. The bearing 24 is a seal-equipped bearing including the inner race 24c, an outer race 24a, a ball 24d, and a seal member 24e. The ball 24d is provided between the outer race 24a and the inner race 24c. The seal member 24e seals between the outer race 24a and the inner race 24c. The bearing 24 supports the nut 20 rotatably relative to the speed reducer containing portion 32.

An opposite axial end side of the nut 20 with respect to the inner race 24c forms a main body portion 20a. A first connection passage 20e in communication with one end of the ball circulation groove 12 is formed on an outer periphery of the main body portion 20a. Further, a second connection passage 20f in communication with an opposite end of the ball circulation groove 12 is formed on the outer periphery of the main body portion 20a. An engagement groove 20g is formed between the first connection passage 20e and the second connection passage 20f. The connection member 23, which is a tubular member, is engaged with the engagement groove 20g. One end side of the connection member 23 is inserted in the first connection passage 20e, and an opposite end side of the connection member 23 is inserted in the second connection passage 20f.

A pair of female screw portions 20b and 20c is formed on the outer periphery of the main body portion 20a. The pair of screw portions 20b and 20c is formed in such a manner that a line connecting them intersects with a line connecting the first connection passage 20e and the second connection passage 20f. A fixation metal 83, which fixes the connection member 23 to the nut 20, is fastened to the female screw portions 20b and 20c by screws (refer to FIG. 5).

The balls 22 in the ball circulation groove 12 are arranged to be able to travel between the first connection passage 20e and the second connection passage 20f by passing through inside the connection member 23. The balls 22 do not travel in the ball circulation groove 12 from end to end, but travels from a position where the first connection passage 20e is formed to a position where the second connection passage 20f is formed.

A communication hole 41 is formed at a position located closer to the inner race 24c (the one end side) on the connection member 23-side of the main body portion 20a where. The connection hole 41 establishes communication between the outer peripheral side and the inner peripheral side of the nut 20. An opening of this communication hole 41 on the inner peripheral side is formed so as to avoid a portion on the nut-side ball screw groove 21 where the balls 22 are circulated. The provision of this communication hole 41 results in establishment of communication between a one-side chamber 30a on one side (a left side in FIG. 4) and an opposite-side chamber 30b on an opposite side (a right side in FIG. 4) with respect to the bearing 24 and the screw mechanism 26.

The nut 20 limits an axial displacement of the nut 20 relative to the housing 30 by sandwiching the outer race 24a of the bearing 24 between a side surface 31a, which is a side surface of the speed reducer containing portion 32 on the one side, and a lock ring 25.

[Details of Connection Member]

Figure 12:
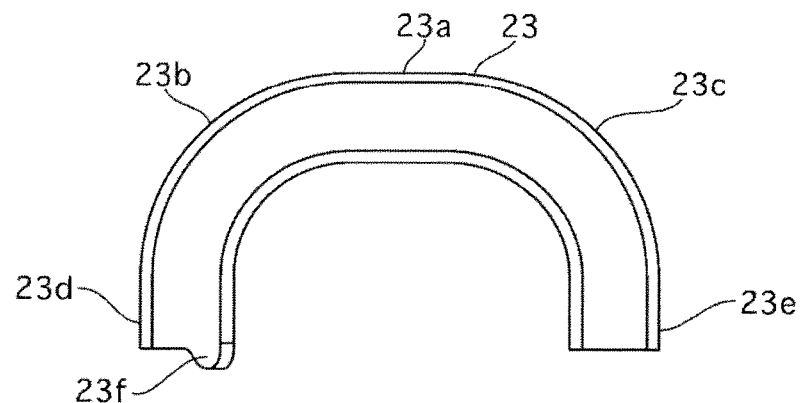
FIG. 12 illustrates a component forming a connection member according to the first embodiment, illustrating this component alone.

FIG. 12 illustrates a component forming the connection member 23, illustrating this component alone.

The connection member 23 includes an intermediate portion 23a, a first bent portion 23b, a second bent portion 23c, a connection member-side first linear portion 23d, a connection member-side second linear portion 23e, and a tongue portion 23f.

The intermediate portion 23a is linearly formed at around an axial center of the connection member 23. The first bent portion 23b is provided between the intermediate portion 23a and the one end side of the connection member 23. The first bent portion 23b is formed in such a manner that a travel direction of the balls 22 passing through therein transitions in a curved manner. The first bent portion 23b is formed into a curved shape so as to be convexed toward the outer peripheral side of the nut 20 with the one end of the connection member 23 inserted in the first connection passage 20e.

The second bent portion 23c is provided between the intermediate portion 23a and the opposite end side of the connection member 23. The first bent portion 23b is formed in such a manner that a travel direction of the balls 22 passing through therein transitions in a curved manner. The second bent portion 23c is formed into a curved shaped so as to be convexed toward the outer peripheral side of the nut 20 with the opposite end of the connection member 23 inserted in the second connection passage 20f.

The connection member-side first linear portion 23d is provided between the first bent portion 23b and the one end of the connection member 23. The connection member-side first linear portion 23d extends in a tangential direction of one end of the first bent portion 23b, and is linearly formed. The connection member-side second linear portion 23e is provided between the second bent portion 23c and the opposite end side of the connection member 23. The connection member-side second linear portion 23e extends in a tangential direction of the opposite end of the second bent portion 23c, and is linearly formed. The tongue portion 23f is formed so as to protrude like a tongue from each of openings of the connection member 23 at the both ends thereof.

The connection member 23 is formed by joining two half-divided members, each of which is configured as illustrated in FIG. 12. These half-divided members are identically shaped, and the tongue portion 23f is formed at an end of one of them. The tongue portion 23f will be provided at each of the openings of the connection member 23 at the both ends with the half-divided members joined together. These half-divided members are, for example, not especially glued together, but are integrally held by being inserted in the first connection passage 20e and the second connection passage 20f and fixed to the nut 20 by the fixation metal 83 with the half-divided members joined together. Even if a gap is generated between the half-divided members, this gap unlikely raises a problem as long as this gap is not large enough to permit the balls 22 to pass therethrough.

[Details of Connection Passage]

Figure 13:
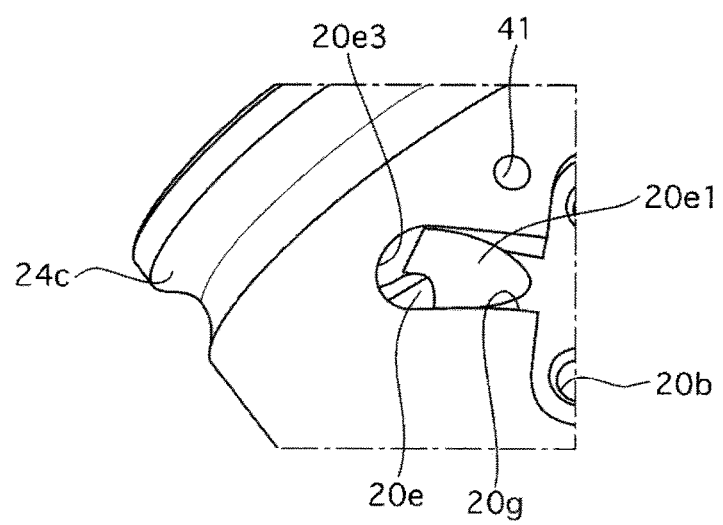
FIG. 13 illustrates an opening of a first connection passage on an outer peripheral side of the nut and a vicinity thereof according to the first embodiment.
Figure 14:
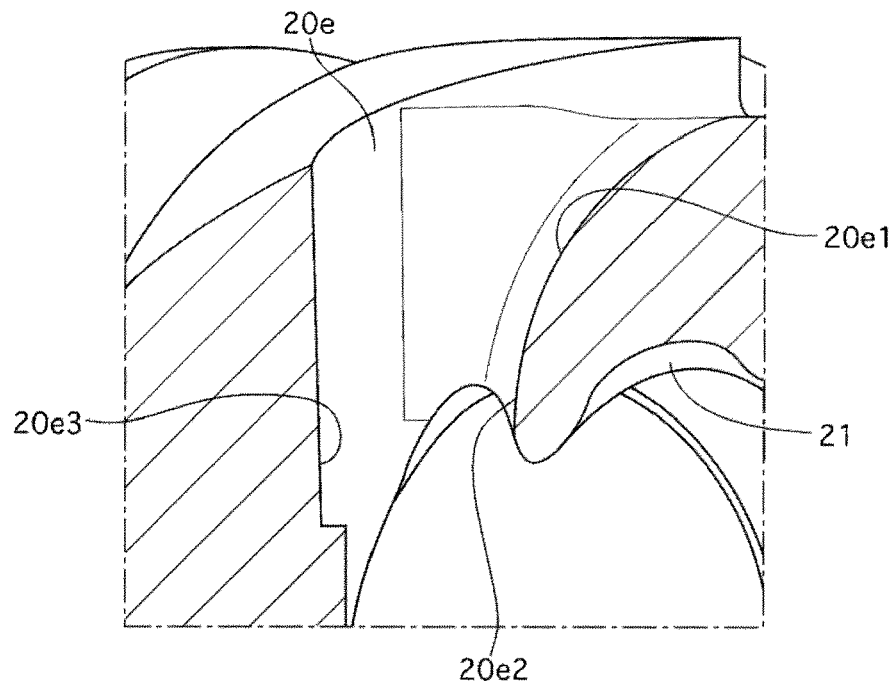
FIG. 14 is a cross-sectional view of the first connection passage and a vicinity thereof according to the first embodiment.
Figure 15:
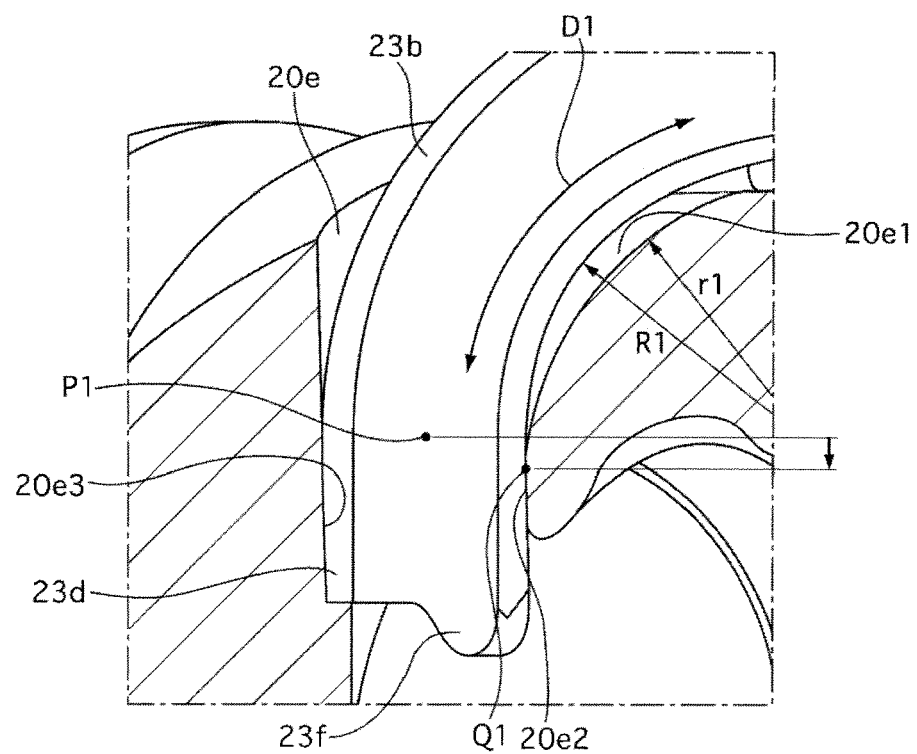
FIG. 15 is a cross-sectional view of the first connection passage and the vicinity thereof according to the first embodiment.
Figure 16:
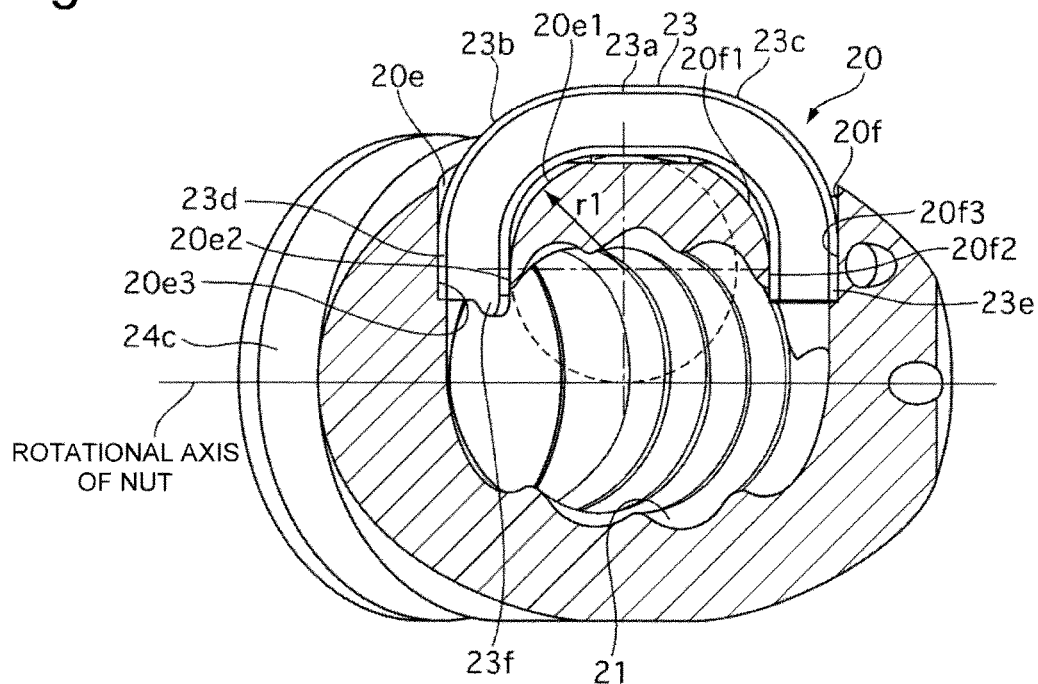
FIG. 16 is a cross-sectional view of the nut according to the first embodiment.
Figure 17:
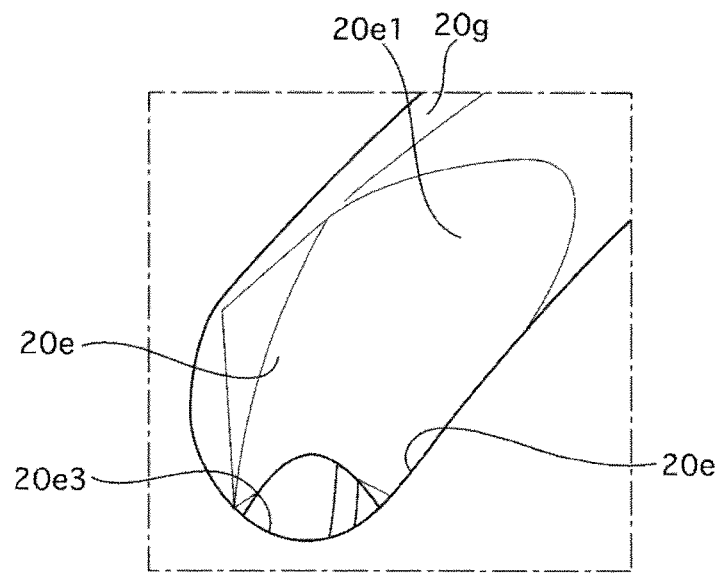
FIG. 17 is an enlarged view of an opening of the first connection passage of the nut on one end side and a vicinity thereof according to the first embodiment.
Figure 18:
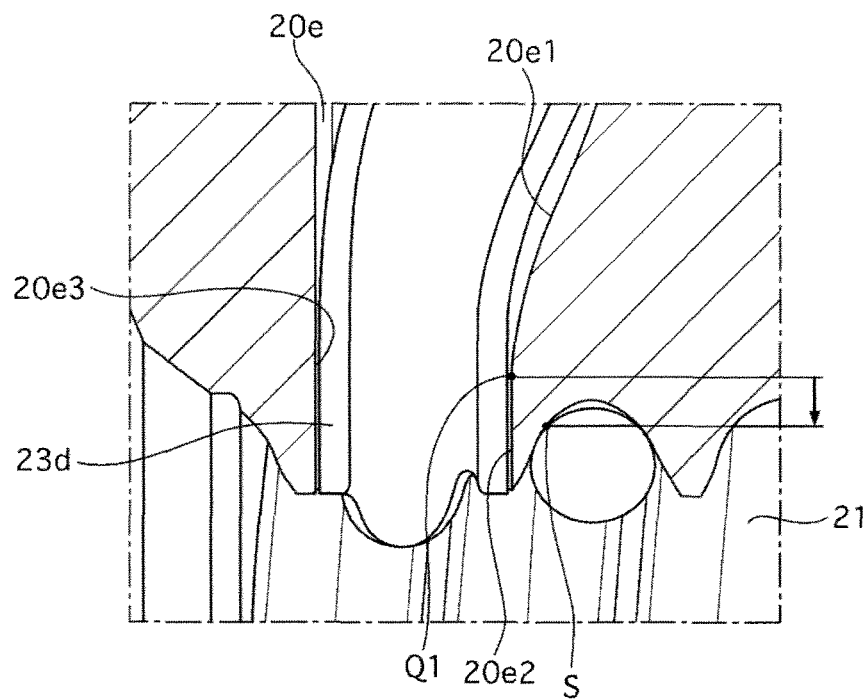
FIG. 18 is a cross-sectional view of an opening of the first connection passage of the nut on an opposite end side and a vicinity thereof according to the first embodiment.

FIG. 13 illustrates an opening of the first connection passage 20e on the one end side (the outer peripheral side of the nut 20), and a vicinity thereof. FIG. 14 is a cross-sectional view of the first connection passage 20e and a vicinity thereof. FIG. 15 is a cross-sectional view of the first connection passage 20e and a vicinity thereof with the connection member 23 inserted in the first connection passage 20e. FIG. 16 is a cross-sectional view of the nut 20 with the connection member 23 mounted thereon. FIG. 17 is an enlarged view of the opening of the first connection passage 20e on the one end side (the outer peripheral side of the nut 20) and the vicinity thereof. FIG. 18 is a cross-sectional view of an opening of the first connection passage 20e on the opposite end side (the end side located closer to the nut-side ball screw groove 21), and a vicinity thereof.

The first connection passage 20e includes a first curved portion 20e1, a circumferential inner first linear portion 20e2, and a circumferential outer first linear portion 20e3.

Now, a first circumferential direction D1 is defined to refer to a line along a direction in which the first bent portion 23b is bent with the connection member 23 inserted in the first connection passage 20e and the second connection passage 20f. The first curved portion 20e1 is located at a position of the first connection passage 20e that faces the first bent portion 23b on an inner side of the first circumferential direction D1 (FIG. 15). Then, the first curved portion 20e1 is formed into a curved shape in such a manner that a space between the first curved portion 20e1 and the first bent portion 23b is equal to or smaller than a predetermined value (the predetermined value does not includes zero).

Further, the first curved portion 20e1 is formed in such a manner that a curvature radius r1 of the first curved portion 20e1 in cross-section is smaller than a curvature radius R1 of the first bent portion 23b of the connection member 23 in cross-section (FIG. 15). In other words, the first curved portion 20e1 is formed in such a manner that the curvature radius R1 of the first bent portion 23b in cross-section is larger than the curvature radius r1 of the first curved portion 20e1 in cross-section (FIG. 15). In this case, the first curved portion 20e1 is formed in such a manner that a center of the curvature radius r1 of the first curved portion 20e1 is located closer to a rotational axis of the nut 20 than the nut-side ball screw groove 21 is (FIG. 16). Further, the first curved portion 20e1 is formed into a circular arc shape in cross-section perpendicular to the first circumferential direction D1 (FIG. 17).

The circumferential inner first linear portion 20e2 is located on the opposite end side (the end side located closer to the nut-side ball screw groove 21) with respect to the first curved portion 20e1 of the first connection passage 20e. The circumferential inner first linear portion 20e2 is connected to the first curved portion 20e1 and the one end of the nut-side ball screw groove 21 (the ball circulation groove 12). The circumferential inner first linear portion 20e2 is formed linearly while extending in a tangential direction of the nut-side ball screw groove 21.

A boundary point P1 is defined to refer to a boundary point between the first bent portion 23b and the connection member-side first linear portion 23d of the connection member 23. A boundary point Q1 is defined to refer to a boundary point between the circumferential inner first linear portion 20e2 and the first curved portion 20e1. The boundary point Q1 is set so as to be positioned on the opposite end side (the end side closer to the nut-side ball screw groove 21) with respect to the boundary point P1 (FIG. 15).

A contact point S is defined to refer to a contact point between the balls 22 and the nut-side ball screw groove 21. The circumferential inner first linear portion 20e2 is formed in such a manner that the contact point S is positioned on the opposite end side (the end side closer to the nut-side ball screw groove 21) with respect to the boundary point Q1 (FIG. 18).

The circumferential outer first linear portion 20e3 is located at a position facing the first bent portion 23b on an outer side of the first circumferential direction D1. The circumferential outer first linear portion 20e3 is formed linearly along an insertion direction when the one end side of the connection member 23 is inserted into the first connection passage 20e.

The second connection passage 20f includes a second curved portion 20f1, a circumferential inner second linear portion 20f2, and a circumferential outer second linear portion 20f3.

Now, a second circumferential direction D2 is defined to refer to a line along a direction in which the second bent portion 23c is bent with the connection member 23 inserted in the first connection passage 20e and the second connection passage 20f. The second curved portion 20f1 is located at a position of the second connection passage 20f that faces the second bent portion 23c on an inner side of the second circumferential direction D2. Then, the second curved portion 20f1 is formed into a curved shape in such a manner that a space between the second curved portion 20f1 and the second bent portion 23c is equal to or smaller than a predetermined value (the predetermined value does not includes zero).

Further, the second curved portion 20f1 is formed in such a manner that a curvature radius of the second curved portion 20f1 in cross-section is smaller than a curvature radius of the second bent portion 23c of the connection member 23 in cross-section. In other words, the second curved portion 20f1 is formed in such a manner that the curvature radius of the second bent portion 23c in cross-section is larger than the curvature radius of the second curved portion 20f1 in cross-section. In this case, the second curved portion 20f1 is formed in such a manner that a center of the curvature radius of the second curved portion 20f1 is located closer to the rotational axis of the nut 20 than the nut-side ball screw groove 21 is. Further, the second curved portion 20f1 is formed into a circular arc shape in cross-section perpendicular to the second circumferential direction D2.

The circumferential inner second linear portion 20f2 is located on the opposite end side (the end side located closer to the nut-side ball screw groove 21) with respect to the second curved portion 20f1 of the second connection passage 20f. The circumferential inner second linear portion 20f2 is connected to the second curved portion 20f1 and the opposite end side of the nut-side ball screw groove 21 (the ball screw ball circulation groove 12). The circumferential inner second linear portion 20f2 is formed linearly while extending in a tangential direction of the nut-side ball screw groove 21.

A boundary point P2 is defined to refer to a boundary point between the second bent portion 23c and the connection member-side second linear portion 23e of the connection member 23. A boundary point Q2 is defined to refer to a boundary point between the circumferential inner second linear portion 20f2 and the second curved portion 20f1. The boundary point Q2 is set so as to be positioned on the opposite end side (the end side closer to the nut-side ball screw groove 21) with respect to the boundary point P2.

As described above, the contact point S is defined to refer to the contact point between the balls 22 and the nut-side ball screw groove 21. The circumferential inner second linear portion 20f2 is formed in such a manner that the contact point S is positioned on the opposite end side (the end side closer to the nut-side ball screw groove 21) with respect to the boundary point Q2.

The circumferential outer second linear portion 20f3 is located at a position facing the second bent portion 23c on an outer side of the second circumferential direction D2. The circumferential outer second linear portion 20f3 is formed linearly along an insertion direction when the opposite end side of the connection member 23 is inserted into the second connection passage 20f.

[Method of Forming Connection Passage]

On the first connection passage 20e, the first curved portion 20e1, the circumferential inner first linear portion 20e2, and the circumferential outer first linear portion 20e3 are formed by machining processing using one type of end mill. The machining processing is performed while the end mill is attached in a direction toward the circumferential inner first linear portion 20e2 and the circumferential outer first linear portion 20e3. At this time, the nut 20 is cut from the outer periphery thereof toward the end side closer to the nut-side ball screw groove 21 (the inner peripheral side), from which the circumferential inner first linear portion 20e2 and the circumferential outer first linear portion 20e3 are formed. Then, a tip of the end mill is moved along the curved shape of the first curved portion 20e1, from which the first curved portion 20e1 is formed.

On the second connection passage 20f, the second curved portion 20f1, the circumferential inner second linear portion 20f2, and the circumferential outer second linear portion 20f3 are formed by machining processing using one type of end mill. The machining processing is performed while the end mill is attached in a direction toward the circumferential inner second linear portion 20f2 and the circumferential outer second linear portion 20f3. At this time, the nut 20 is cut from the outer periphery thereof toward the end side closer to the nut-side ball screw groove 21 (the inner peripheral side), from which the circumferential inner second linear portion 20f2 and the circumferential outer second linear portion 20f3 are formed. Then, the tip of the end mill is moved along the curved shape of the second curved portion 20f1, from which the second curved portion 20f1 is formed.

[Functions]

It is preferable that the first bent portion 23b and the second bent portion 23c of the connection member 23 have as large curvature radii as possible to allow the balls 22 to smoothly travel in the connection member 23. However, simply increasing the respective curvature radii of the first bent portion 23b and the second bent portion 23c leads to a significant protrusion of the connection member 23 from the outer peripheral surface of the nut 20, resulting in an undesirable increase in the size of the nut 20 with the connection member 23 mounted thereon.

Therefore, one possible solution is to partially embed the connection member 23 in the nut 20. To achieve that, the openings of the first connection passages 20e and the second connection passages 20f should be subjected to processing for preventing the first connection passage 20e and the second connection passage 20f from interfering with the first bent portion 23b and the second bent portion 23c, respectively. A comparison example will be described as an example of the processing for preventing the first connection passage 20e and the second connection passage 20f from interfering with the first bent portion 23b and the second bent portion 23c, respectively.

Figure 19:
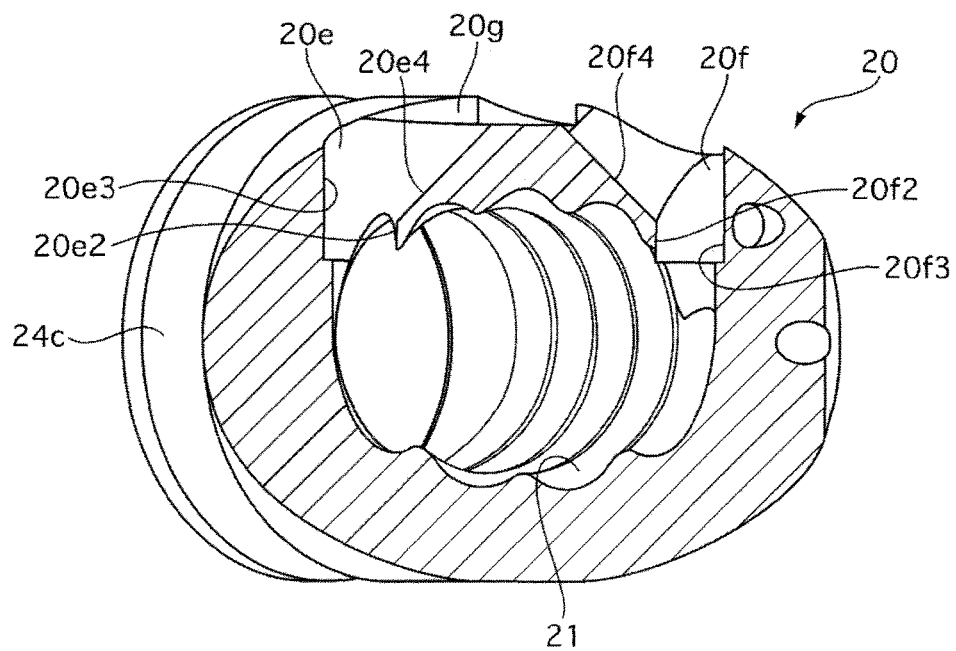
FIG. 19 is a cross-sectional view of a nut according to a comparison example.
Figure 20:
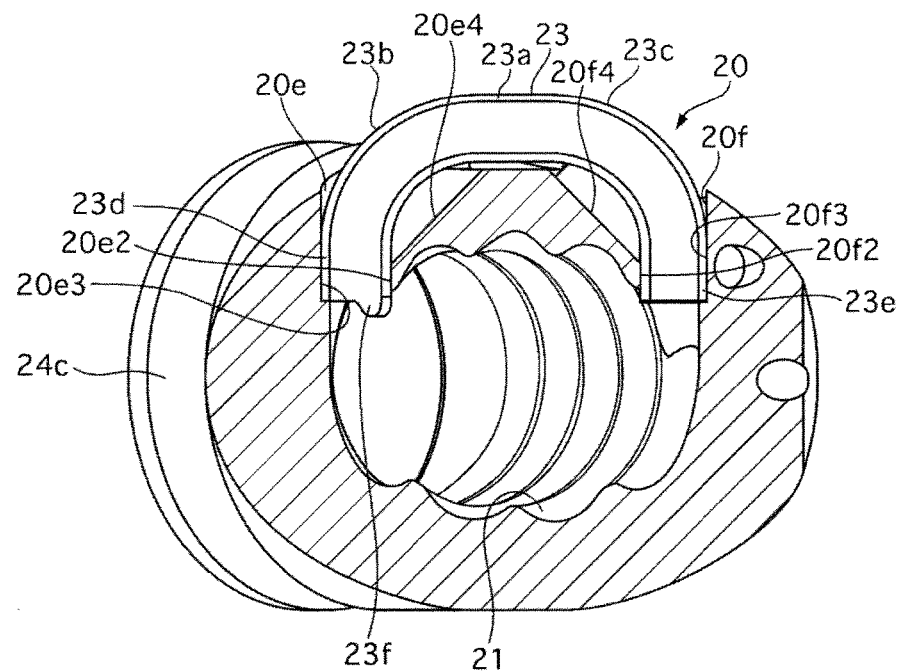
FIG. 20 is a cross-sectional view of the nut according to the comparison example.
Figure 21:
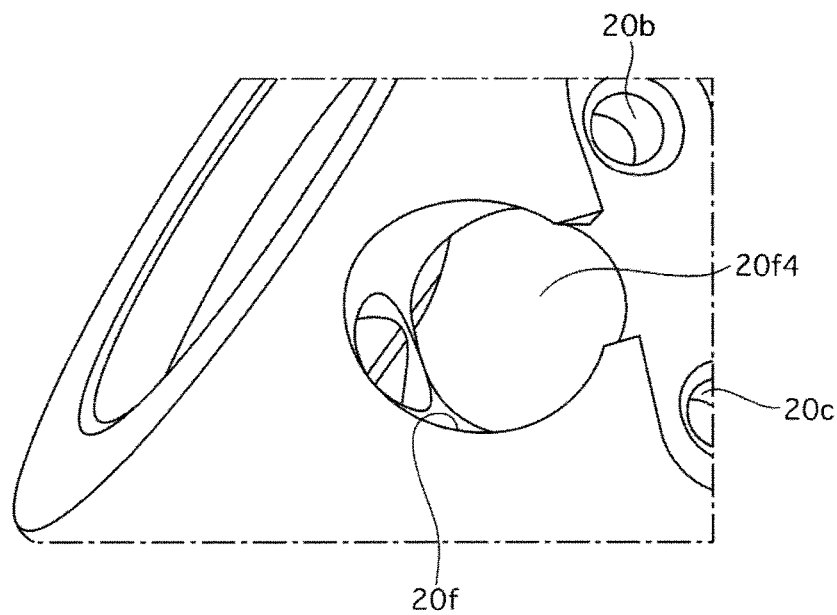
FIG. 21 illustrates an opening of a second connection passage of the nut on one end side and a vicinity thereof according to the comparison example.

FIG. 19 is a cross-sectional view of the nut 20 according to the comparison example. FIG. 20 is a cross-sectional view of the nut 20 with the connection member 23 mounted thereon according to the comparison example. FIG. 21 illustrates an opening of the second connection passage 20f of the nut 20 on the outer peripheral side, and a vicinity thereof according to the comparison example. FIG. 22 is an enlarged cross-sectional view illustrating the first connection passage 20e and the vicinity thereof according to the first embodiment (FIG. 22(A)), and the first connection passage 20e and the vicinity thereof according to the comparison example (FIG. 22(B)).

In the comparison example, the machining processing is performed while the end mill is inserted obliquely with respect to the first connection passage 20e and the second connection passage 20f, thereby forming a first inclined portion 20e4 and a second inclined portion 20f4 on the first connection passage 20e and the second connection passage 20f, respectively.

Forming the first inclined portion 20e4 and the second inclined portion 20f4 on the first connection passage 20e and the second connection passage 20f, respectively, like the comparison example, leads to a reduction in a thickness between each of the first inclined portion 20e4 and the second inclined portion 20f4 and the nut-side ball screw groove 21, thereby raising a possibility of failing to keep a strength sufficient (FIG. 22).

Therefore, in the first embodiment, the first curved portion 20e1 of the first connection passage 20e is formed into the curved shape in such a manner that the space between the first curved portion 20e1 and the first bent portion 23b of the connection member 23 is equal to or smaller than the predetermined value. Further, the second curved portion 20f1 of the second connection passage 20f is formed into the curved shape in such a manner that the space between the second curved portion 20f1 and the second bent portion 23c of the connection member 23 is equal to or smaller than the predetermined value.

Forming the first curved portion 20e1 and the second curved portion 20f1 in this manner can keep the thickness of the nut 20 sufficient along with increasing the respective curvature radii of the first bent portion 23b and the second bent portion 23c. Therefore, this formation can allow the balls 22 to smoothly travel in the connection member 23, and also keep the strength of the nut 20 sufficient.

Further, in the first embodiment, the first curved portion 20e1 is formed in such a manner that the curvature radius of the first bent portion 23b of the connection member 23 is equal to or larger than the curvature radius of the first curved portion 20e1 of the nut 20. Similarly, the second curved portion 20f1 is formed in such a manner that the curvature radius of the second bent portion 23c of the connection member 23 is equal to or larger than the curvature radius of the second curved portion 20f1 of the nut 20.

Forming the first curved portions 20e1 and the second curved portion 20f1 in this manner can prevent or reduce the respective interference contacts of the first bent portion 23b and the second bent portion 23c of the connection member 23 with the first curved portion 20e1 and the second curved portion 20f1 of the nut 20. Therefore, this formation can achieve the reduction in the size of the entire nut 20 with the connection member 23 mounted on the nut 20.

Further, in the first embodiment, the circumferential inner first linear portion 20e2, which linearly connects the first curved portion 20e1 and the one end side of the ball circulation groove 12, is formed on the opposite end side of the first connection passage 20e with respect to the first curved portion 20e1. Similarly, the circumferential inner second linear portion 20f2, which linearly connects the second curved portion 20f1 and the opposite end side of the ball circulation groove 12, is formed on the opposite end side of the second connection passage 20f with respect to the second curved portion 20f1.

This formation can establish respective smooth connections between the ball circulation groove 12 and the first curved portion 20e1 of the connection member 23, and the ball circulation groove 12 and the second curved portion 20f1 of the connection member 23. The circumferential inner first linear portion 20e2 and the circumferential inner second linear portion 20f2 generally coincide with the tangential directions of the ball circulation groove 12, respectively, which allows the balls to further smoothly travel between the ball circulation groove 12 and the connection member 23.

Further, in the first embodiment, the boundary point Q1 between the first bent portion 23b and the connection member-side first linear portion 23d of the connection member 23 is set so as to be positioned on the opposite end side of the first connection passage 20e (the end side closer to the nut-side ball screw groove 21) with respect to the boundary point P1 between the first curved portion 20e1 and the circumferential inner first linear portion 20e2 of the first connection passage 20e. Similarly, the boundary point P2 between the second curved portion 20f1 and the circumferential inner second linear portion 20f2 of the second connection passage 20f is set so as to be positioned on the opposite end side of the second connection passage 20f (the end side closer to the nut-side ball screw groove 21) with respect to the boundary point Q2 between the second bent portion 23c and the connection member-side second linear portion 23e of the connection member 23.

Setting the boundary points in this manner can prevent or reduce the respective interference contacts of the first bent portion 23b and the second bent portion 23c of the connection member 23 with the first curved portion 20e1 and the second curved portion 20f1 of the nut 20, and also reduce the size of the entire nut 20 with the connection member 23 mounted on the nut 20.

Further, in the first embodiment, the contact point S between the nut-side ball screw groove 21 and the balls 22 is set so as to be positioned on the opposite end side (the end side closer to the nut-side ball screw groove 21) of the first connection passage 20e with respect to the boundary point Q1 between the first curved portion 20e1 and the circumferential inner first linear portion 20e2. Similarly, the contact point S between the nut-side ball screw groove 21 and the balls 22 is set so as to be positioned on the opposite end side (the end side closer to the nut-side ball screw groove 21) of the second connection passage 20f with respect to the boundary point Q2 between the second curved portion 20f1 and the circumferential inner second linear portion 20f2.

The contact point S between the nut-side ball screw groove 21 and the balls 22 are subject to a load from the balls 22 onto the nut 20. The above-described setting can make sufficient a distance between the contact point S and each of the first curved portion 20e1 and the second curved portion 20f1, thereby preventing or cutting down the reduction in the thickness.

Further, in the first embodiment, the first curved portion 20e1 is formed in such a manner that the center of the curvature radius of the first curved portion 20e1 of the first connection passage 20e is located closer to the rotational axis of the nut 20 than the nut-side ball screw groove 21 is. Similarly, the second curved portion 20f1 is formed in such a manner that the center of the curvature radius of the second curved portion 20f1 of the second connection passage 20f is located closer to the rotational axis of the nut 20 than the nut-side ball screw groove 21 is.

Forming the first curved portion 20e1 and the second curved portion 20f1 in this manner allows the first curved portion 20e1 of the first connection passage 20e and the second curved portion 20f1 of the second connection passage 20f to have sufficient curvature radii, and the first bent portion 23b and the second bent portion 23c of the connection member 23 to have sufficiently large curvature radii according thereto. Therefore, this formation contributes to the smooth travel of the balls 22 in the connection member 23.

Further, in the first embodiment, the circumferential outer first linear portion 20e3 is formed so as to be located at the position facing the first bent portion 23b of the connection member 23 on the outer side of the first connection passage 20e in the first circumferential direction D1, and be shaped linearly along the insertion direction in which the one end side of the connection member 23 is inserted into the first connection passage 20e. Similarly, the circumferential outer second linear portion 20f3 is formed so as to be located at the position facing the second bent portion 23c of the connection member 23 on the outer side of the second connection passage 20f in the second circumferential direction D2, and be shaped linearly along the insertion direction in which the opposite end side of the connection member 23 is inserted into the second connection passage 20f.

This formation facilitates the installation of the connection member 23 into the first connection passage 20e and the second connection passage 20f.

Further, in the first embodiment, the manufacturing method is constructed so as to form the first curved portion 20e1 and the circumferential outer first linear portion 20e3 of the first connection passage 20e by the machining processing with use of the same tool. Similarly, the manufacturing method is constructed so as to form the second curved portion 20f1 and the circumferential outer second linear portion 20f3 of the second connection passage 20f by the machining processing with use of the same tool.

This manufacturing method eliminates the necessity of switching the tool between the processing of the first curved portion 20e1 and the processing of the circumferential outer first linear portion 20e3, thereby contributing to improvement of work efficiency when the first connection passage 20e is formed by the machining processing. Similarly, this manufacturing method eliminates the necessity of switching the tool between the processing of the second curved portion 20f1 and the processing of the circumferential outer second linear portion 20f3, thereby contributing to improvement of work efficiency when the second connection passage 20f is formed by the machining processing Further, in the first embodiment, the first curved portion 20e1 of the first connection passage 20e is arranged so as to be formed into the circular arc shape in cross-section perpendicular to the first circumferential direction D1. Similarly, the second curved portion 20f1 of the second connection passage 20f is arranged so as to be formed into the circular arc shape in cross-section perpendicular to the second circumferential direction D2.

Figure 23:
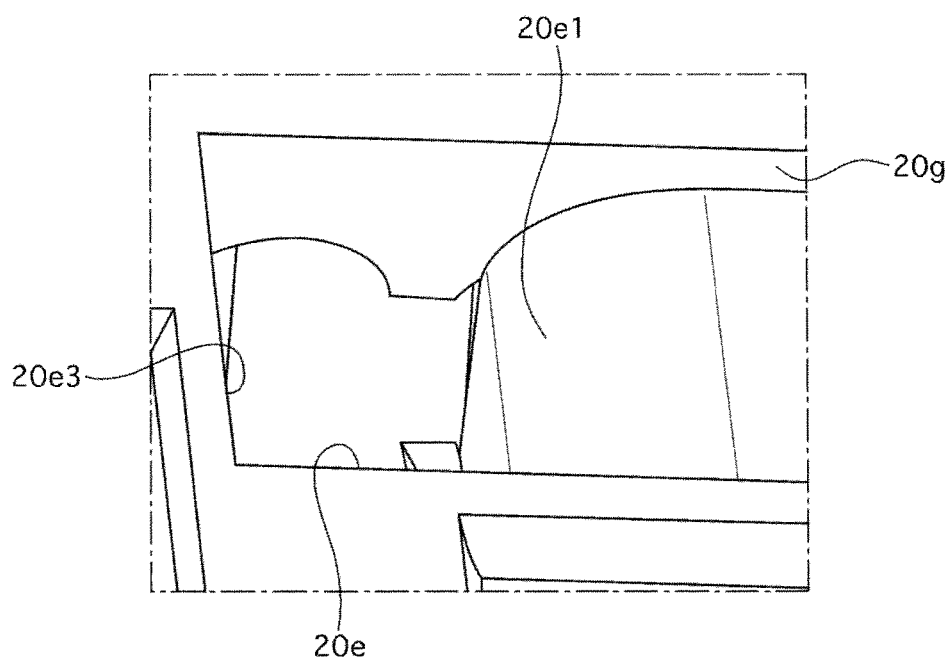
FIG. 23 illustrates an example in which a first curved portion of the first connection passage is formed into a quadrilateral shape in cross-section.
Figure 24:
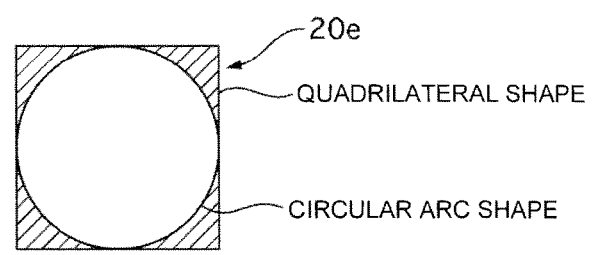
FIG. 24 is a schematic view illustrating a cross-sectional shape of the first curved portion of the first connection passage.

FIG. 23 illustrates an example in which the first curved portion 20e1 of the first connection passage 20e is formed into a quadrilateral shape in cross-section perpendicular to the first circumferential direction D1. FIG. 24 is a schematic view of the cross-sectional shape of the first curved portion 20e1 of the first connection passage 20e.

Forming each of the first curved portion 20e1 and the second curved portion 20f1 into the quadrilateral shape in cross-section leads to an increase in an area of each of the first curved portion 20e1 and the second curved portion 20f1 compared to the formation into the circular arc shape. Therefore, forming each of the first curved portion 20e1 and the second curved portion 20f1 into the circular arc shape in cross-section can keep the thickness of the nut 20 sufficient.

Further, in the first embodiment, the manufacturing method is constructed so as to form the first curved portion 20e1 and the circumferential outer first linear portion 20e3 by the machining processing while rotating the tool used to form the first curved portion 20e1 and the circumferential outer first linear portion 20e3 of the first connection passage 20e around a rotational axis kept in a generally constant direction. Similarly, the manufacturing method is constructed so as to form the second curved portion 20f1 and the circumferential outer second linear portion 20f3 by the machining processing while rotating the tool used to form the second curved portion 20f1 and the circumferential outer second linear portion 20f3 of the second connection passage 20f around a rotational axis kept in a generally constant direction.

This manufacturing method eliminates the necessity of attaching the nut 20 to the machine tool at different angles between the processing of the first curved portion 20e1 and the processing of the circumferential outer first linear portion 20e3, thereby contributing the improvement of the work efficiency when the first connection passage 20e is formed by the machining processing. Similarly, this manufacturing method eliminates the necessity of attaching the nut 20 to the machine tool at different angles between the processing of the second curved portion 20f1 and the processing of the circumferential outer second linear portion 20f3, thereby contributing the improvement of the work efficiency when the second connection passage 20f is formed by the machining processing.

Effects (1) The power steering apparatus 1 includes the wheel turning shaft 10 configured to turn the turning target wheel by being axially displaced according to the rotation of the steering wheel, the wheel turning shaft-side ball screw groove 11 provided on the outer peripheral side of the wheel turning shaft 10 and including the helically grooved shape, the nut made from the metallic material, including the main body portion 20a formed annularly so as to surround the wheel turning shaft 10, and provided rotatably relative to the wheel turning shaft 10, the nut-side ball screw groove 21 provided on the inner peripheral side of the nut 20, including the helically grooved shape, and forming the helical ball circulation groove 12 together with the wheel turning shaft-side ball screw groove 11, the plurality of balls 22 provided movably in the ball circulation groove 12, the first connection passage 20e provided in the nut 20 and formed in such a manner that the one end side of the first connection passage 20e is opened on the outer peripheral surface of the nut 20 and the opposite end side of the first connection passage 20e is opened on the inner peripheral surface of the nut 20 on the one end side of the ball circulation groove 12, the second connection passage 20f provided in the nut 20 and formed in such a manner that the one end side of the second connection passage 20f is opened on the outer peripheral surface of the nut 20 and the opposite end side of the second connection passage 20f is opened on the inner peripheral surface of the nut 20 on the opposite end side of the ball circulation groove 12, and the connection member 23 having the one end side and the opposite end side inserted in the first connection passage 20e and the second connection passage 20f, respectively. The connection member 23 is configured as the tubular member connecting the first connection passage 20e and the second connection passage 20f to each other so as to allow the plurality of balls 22 to travel between the first connection passage 20e-side and the second connection passage 20f-side. The connection member 23 includes the first bent portion 23b provided between the one end side of the tubular member and the generally intermediate portion 23a and formed in such a manner that the travel direction of the plurality of balls 22 transitions in the curved manner, and the second bent portion 23c provided between the opposite end side and the generally intermediate portion and formed in such a manner that the travel direction of the plurality of balls 22 transitions in the curved manner. The power steering apparatus further includes the first curved portion 20e1 provided at the position of the first connection passage 20e that faces the first bent portion 23b on the inner side of the first circumferential direction D1 assuming that the first circumferential direction is the line along the bent direction of the first bent portion 23b, and formed into the curved shape in such a manner that the space between the first curved portion 20e1 and the first bent portion 23b is equal to or smaller than the predetermined value, the second curved portion 20f1 provided at the position of the second connection passage 20f that faces the second bent portion 23c on the inner side of the second circumferential direction D2 assuming that the second circumferential direction D2 is the line along the bent direction of the second bent portion 23c, and formed into the curved shape in such a manner that the space between the second curved portion 20f1 and the second bent portion 20c is equal to or smaller than the predetermined value, and the electric motor 40 configured to rotationally drive the nut 20 and provide the steering force to the wheel turning shaft 10 by the conversion of the rotation of the nut 20 into the axial movement of the wheel turning shaft 10.

Therefore, the first embodiment can allow the balls 22 to smoothly travel in the connection member 23 and also keep the strength of the nut 20 sufficient.

(2) The first curved portion 20e1 and the second curved portion 20f1 are formed in such a manner that the curvature radius of the first bent portion 23b is equal to or larger than the curvature radius of the first curved portion 20e1 and the curvature radius of the second bent portion 23c is equal to or larger than the curvature radius of the second curved portion 20f1.

Therefore, the first embodiment can achieve the reduction in the size of the entire nut 20 with the connection member 23 mounted on the nut 20.

(3) The first connection passage 20e includes the circumferential inner first linear portion 20e2 provided on the opposite end side of the first connection passage 20e with respect to the first curved portion 20e1 and linearly connecting the first curved portion 20e1 and the one end side of the ball circulation groove 12. The second connection passage 20f includes the circumferential inner second linear portion 20f2 provided on the opposite end side of the second connection passage 20f with respect to the second curved portion 20f1 and linearly connecting the second curved portion 20f1 and the opposite end side of the ball circulation groove 12.

Therefore, the first embodiment can establish the respective smooth connections between the ball circulation groove 12 and the first curved portion 20e1 of the connection member 23, and between the ball circulation groove 12 and the second curved portion 20f1 of the connection member 23.

(4) The connection member 23 includes the connection member-side first linear portion 23d linearly formed between the first bent portion 23b and the one end side of the connection member 23, and the connection member-side second linear portion 23e linearly formed between the second bent portion 23c and the opposite end side of the connection member 23. The first connection passage 20e is formed in such a manner that the boundary between the first curved portion 20e1 and the circumferential inner first linear portion 20e2 is located on the opposite end side of the first connection passage 20e with respect to the boundary between the first bent portion 23b and the connection member-side first linear portion 23d of the connection member 23. The second connection passage 20f is formed in such a manner that the boundary between the second curved portion 20f1 and the circumferential inner second linear portion 20f2 is located on the opposite end side of the second connection passage 20f with respect to the boundary between the second bent portion 23c and the connection member-side second linear portion 23e of the connection member 23.

Therefore, the first embodiment can reduce the size of the entire nut 20 with the connection member 23 mounted on the nut 20.

(5) The first connection passage 20e is formed in such a manner that the contact point S between the nut-side ball screw groove 21 and the plurality of balls 22 is located on the opposite end side of the first connection passage 20e with respect to the boundary Q1 between the first curved portion 20e1 and the circumferential inner first linear portion 20e2. The second connection passage 20f is formed in such a manner that the contact point S between the nut-side ball screw groove 21 and the plurality of balls 22 is located on the opposite end side of the second connection passage 20f with respect to the boundary Q2 between the second curved portion 20f1 and the circumferential inner second linear portion 20f2.

Therefore, the first embodiment can make sufficient the distance between the contact point S and each of the first and second curved portions 20e1 and 20f1, thereby preventing or cutting down the reduction in the thickness.

(6) The first curved portion 20e1 is formed in such a manner that the center of the curvature radius of the first curved portion 20e1 is located closer to the rotational axis of the nut 20 than the nut-side ball screw groove 21 is. The second curved portion 20f1 is formed in such a manner that the center of the curvature radius of the second curved portion 20f1 is located closer to the rotational axis of the nut 20 than the nut-side ball screw groove 21 is.

Therefore, the first embodiment allows the first bent portion 23b and the second bent portion 23c of the connection member 23 to be formed so as to have large curvature radii, thereby allowing the balls 22 to smoothly travel in the connection member 23.

(7) The first connection passage 20e includes the circumferential outer first linear portion 20e3 provided at the position of the first connection passage 20e that faces the first bent portion 23b on the outer side of the first circumferential direction D1. The circumferential outer first linear portion 20e3 is shaped linearly along the insertion direction when the one end side of the connection member 23 is inserted into the first connection passage 20e. The second connection passage 20f includes the circumferential outer second linear portion 20f3 provided at the position of the second connection passage 20f that faces the second bent portion 23c on the outer side of the second circumferential direction D2. The circumferential outer second linear portion 20f3 is shaped linearly along the insertion direction when the opposite end side of the connection member 23 is inserted into the second connection passage 20f.

Therefore, the first embodiment facilitates the installation of the connection member 23 into the first connection passage 20e and the second connection passage 20f.

(8) The first curved portion 20e1 and the circumferential outer first linear portion 20e3 are formed by the machining processing using the same tool. The second curved portion 20f1 and the circumferential outer second linear portion 20f3 are formed by the machining processing using the same tool.

Therefore, the first embodiment can improve the work efficiency when the first connection passage 20e and the second connection passage 20f are formed by the machining processing.

(9) The first curved portion 20e1 is formed into the circular arc shape in cross-section perpendicular to the first circumferential direction D1. The second curved portion 20f1 is formed into the circular arc shape in cross-section perpendicular to the second circumferential direction D2.

Therefore, the first embodiment can keep the thickness of the nut 20 sufficient.

(10) The first embodiment provides the method of manufacturing the power steering apparatus 1. The power steering apparatus 1 includes the wheel turning shaft 10 configured to turn the turning target wheel by being axially displaced according to the rotation of the steering wheel, the wheel turning shaft-side ball screw groove 11 provided on the outer peripheral side of the wheel turning shaft 10 and having the helically grooved shape, the nut 20 made from the metallic material, including the main body portion 20a formed annularly so as to surround the wheel turning shaft 10, and provided rotatably relative to the wheel turning shaft 10, the nut-side ball screw groove 21 provided on the inner peripheral side of the nut 20, having the helically grooved shape, and forming the helical ball circulation groove 12 together with the wheel turning shaft-side ball screw groove 11, the plurality of balls 22 provided movably in the ball circulation groove 12, the first connection passage 20e provided in the nut 20 and formed in such a manner that the one end side of the first connection passage 20e is opened on the outer peripheral surface of the nut 20 and the opposite end side of the first connection passage 20e is opened on the inner peripheral surface of the nut 20 on the one end side of the ball circulation groove 12, the second connection passage 20f provided in the nut 20 and formed in such a manner that the one end side of the second connection passage 20f is opened on the outer peripheral surface of the nut 20 and the opposite end side of the second connection passage 20f is opened on the inner peripheral surface of the nut 20 on the opposite end side of the ball circulation groove 12, and the connection member 23 having the one end side and the opposite end side inserted in the first connection passage 20e and the second connection passage 20f, respectively. The connection member 23 is configured as the tubular member connecting the first connection passage 20e and the second connection passage 20f to each other so as to allow the plurality of balls 22 to travel between the first connection passage 20e-side and the second connection passage 20f-side. The connection member 23 includes the first bent portion 23b provided between the one end side of the tubular member and the generally intermediate portion 23a and formed in such a manner that the travel direction of the plurality of balls 22 transitions in the curved manner, and the second bent portion 23c provided between the opposite end side and the generally intermediate portion 23a and formed in such a manner that the travel direction of the plurality of balls 22 transitions in the curved manner. The power steering apparatus further includes the electric motor 40 configured to rotationally drive the nut 20 and provide the steering force to the wheel turning shaft 10 by the conversion of the rotation of the nut 20 into the axial movement of the wheel turning shaft 10. The method includes forming, by the machining processing, the first curved portion 20e1 having such a curved shape that the space between the first curved portion 20e1 and the first bent portion 23b is equal to or smaller than the predetermined value at the position of the first connection passage 20e that faces the first bent portion 23b on the inner side of the first circumferential direction D1, assuming that the first circumferential direction D1 is the line along the bent direction of the first bent portion 23b, and forming, by the machining processing, the second curved portion 20f1 having such a curved shape that the space between the second curved portion 20f1 and the second bent portion 23c is equal to or smaller than the predetermined value at the position of the second connection passage 20f that faces the second bent portion 23c on the inner side of the second circumferential direction 92, assuming that the second circumferential direction D2 is the line along the bent direction of the second bent portion 23c.

Therefore, the first embodiment can allow the balls 22 to smoothly travel in the connection member 23 and also keep the strength of the nut 20 sufficient.

(11) The first curved portion 20e1 and the circumferential outer first linear portion 20e3 are formed by the machining processing while the tool used to form the first curved portion 20e1 and the circumferential outer first linear portion 20e3 is rotated around the rotational axis kept in the generally constant direction. The second curved portion 20f1 and the circumferential outer second linear portion 20f3 are formed by the machining processing while the tool used to form the second curved portion 20f1 and the circumferential outer second linear portion 20f3 is rotated around the rotational axis kept in the generally constant direction.

Therefore, the first embodiment can improve the work efficiency when the first connection passage 20e and the second connection passage 20f are formed by the machining processing.

OTHER EMBODIMENTS

Having described how the present invention can be embodied based on the first embodiment, the specific configuration of each embodiment of the present invention is not limited to the first embodiment, and the present invention also includes a design modification and the like thereof made within a range that does not depart from the spirit of the present invention.

For example, the first embodiment has been described referring to the example in which the communication hole 41 is formed at the nut 20, but the communication hole 41 may be omitted from the nut 20.

Further, the first embodiment has been described referring to the example in which the belt 28 is used as the transmission member that transmits the rotation of the input pulley 35 to the output pulley 27, but the transmission member is not limited to the belt 28 and may be a chain or the like.

[Technical Ideas]

Further, examples of other technical ideas recognizable from the above-described embodiment will be described below.

First Exemplary Embodiment

A power steering apparatus includes a wheel turning shaft (a rack) configured to turn a turning target wheel by being axially displaced according to a rotation of a steering wheel, a wheel turning shaft-side ball screw groove provided on an outer peripheral side of the wheel turning shaft and having a helically grooved shape, a nut made from a metallic material, including a main body portion formed annularly so as to surround the wheel turning shaft, and provided rotatably relative to the wheel turning shaft, a nut-side ball screw groove provided on an inner peripheral side of the nut, having a helically grooved shape, and forming a helical ball circulation groove together with the wheel turning shaft-side ball screw groove, a plurality of balls provided movably in the ball circulation groove, a first connection passage provided in the nut and formed in such a manner that one end side of the first connection passage is opened on an outer peripheral surface of the nut and an opposite end side of the first connection passage is opened on an inner peripheral surface of the nut on one end side of the ball circulation groove, a second connection passage provided in the nut and formed in such a manner that one end side of the second connection passage is opened on the outer peripheral surface of the nut and an opposite end side of the second connection passage is opened on the inner peripheral surface of the nut on an opposite end side of the ball circulation groove, and a connection member having one end side and an opposite end side inserted in the first connection passage and the second connection passage, respectively. The connection member is configured as an annular member connecting the first connection passage and the second connection passage to each other so as to allow the plurality of balls to travel between a first passage-side and a second passage-side. The connection member includes a first bent portion provided between the one end side of the annular member and a generally intermediate portion and formed in such a manner that a travel direction of the plurality of balls transitions in a curved manner, and a second bent portion provided between the opposite end side and the generally intermediate portion and formed in such a manner that the travel direction of the plurality of balls transitions in a curved manner. The power steering apparatus further includes a first curved portion provided at a position of the first connection passage that faces the first bent portion on an inner side of a first circumferential direction assuming that the first circumferential direction is a line along a bent direction of the first bent portion, and formed into a curved shape in such a manner that a space between the first curved portion and the first bent portion is equal to or smaller than a predetermined value, a second curved portion provided at a position of the second connection passage that faces the second bent portion on an inner side of a second circumferential direction assuming that the second circumferential direction is a line along a bent direction of the second bent portion, and formed into a curved shape in such a manner that a space between the second curved portion and the second bent portion is equal to or smaller than a predetermined value, and an electric motor configured to rotationally drive the nut and provide a steering force to the wheel turning shaft by a conversion of a rotation of the nut into an axial movement of the wheel turning shaft.

According to the first exemplary embodiment, the first and second connection passages are each shaped into the curved shape in conformity with the curved shape of the connection member, which can both achieve the increase in the curvature radius of the bent portion of the connection member and keep the thickness of the nut sufficient. The increased curvature radius of the bent portion of the connection member allows the balls to smoothly travel, and the thickness of the nut kept sufficient enhances the strength of the nut.

Second Exemplary Embodiment

In the power steering apparatus according to the first exemplary embodiment, the first curved portion and the second curved portion are formed in such a manner that a curvature radius of the first bent portion is equal to or larger than a curvature radius of the first curved portion and a curvature radius of the second bent portion is equal to or larger than a curvature radius of the second curved portion.

According to the second exemplary embodiment, the respective interference contacts between the first and second bent portions and the first and second curved portions can be prevented or reduced.

Third Exemplary Embodiment

In the power steering apparatus according to the second exemplary embodiment, the first connection passage includes a circumferential inner first linear portion provided on the opposite end side of the first connection passage with respect to the first curved portion and linearly connecting the first curved portion and the one end side of the ball circulation groove. The second connection passage includes a circumferential inner second linear portion provided on the opposite end side of the second connection passage with respect to the second curved portion and linearly connecting the second curved portion and the opposite end side of the ball circulation groove.

According to the third exemplary embodiment, the ball circulation groove and each of the first and second curved portions can be smoothly connected to each other. The circumferential inner first linear portion and the circumferential inner second linear portion may be formed so as to generally coincide with the tangential directions of the ball circulation groove that pass through the one end and the opposite end of the ball circulation groove, respectively, which allows the balls to further smoothly travel.

Fourth Exemplary Embodiment

In the power steering apparatus according to the third exemplary embodiment, the connection member includes a connection member-side first linear portion linearly formed between the first bent portion and the one end side of the connection member, and a connection member-side second linear portion linearly formed between the second bent portion and the opposite end side of the connection member. The first connection passage is formed in such a manner that a boundary between the first curved portion and the circumferential inner first linear portion is located on the opposite end side of the first connection passage with respect to a boundary between the first bent portion and the connection member-side linear portion of the connection member. The second connection passage is formed in such a manner that a boundary between the second curved portion and the circumferential inner second linear portion is located on the opposite end side of the second connection passage with respect to a boundary between the second bent portion and the connection member-side linear portion of the connection member.

According to the fourth exemplary embodiment, the respective interference contacts between the first and second bent portions and the first and second curved portions can be further effectively prevented or reduced.

Fifth Exemplary Embodiment

In the power steering apparatus according to the third exemplary embodiment, the first connection passage is formed in such a manner that a point on the first curved portion that is located a shortest distance away from a contact point between the nut-side ball screw groove and the plurality of balls is located on the opposite end side of the first connection passage with respect to a boundary between the first curved portion and the circumferential inner first linear portion. The second connection passage is formed in such a manner that a point on the second curved portion that is located a shortest distance away from the contact point between the nut-side ball screw groove and the plurality of balls is located on the opposite end side of the second connection passage with respect to a boundary between the second curved portion and the circumferential inner second linear portion.

The contact point between the nut-side ball screw groove and the balls is subject to a load on the nut, and a further strict requirement is imposed regarding the strength at a portion where a distance between this contact point and each of the first and second curved portions is minimized. According to the fifth exemplary embodiment, this point is formed on a deeper side than the region where each of the first and second curved portions is formed, which can eliminate or reduce the influence of the reduction in the thickness due to the formation of each of the first and second curved portions.

Sixth Exemplary Embodiment

In the power steering apparatus according to the second exemplary embodiment, the first curved portion is formed in such a manner that a center of the curvature radius of the first curved portion is located closer to a rotational axis of the nut than the nut-side ball screw groove is. The second curved portion is formed in such a manner that a center of the curvature radius of the second curved portion is located closer to the rotational axis of the nut than the nut-side ball screw groove is.

According to the sixth exemplary embodiment, the first and second curved portions can have sufficient curvature radii, and the first and second bent portions can have large curvature radii according thereto, which contributes to the smooth travel of the balls in the connection member.

Seventh Exemplary Embodiment

In the power steering apparatus according to the first exemplary embodiment, the first connection passage includes a circumferential outer first linear portion provided at a position of the first connection passage that faces the first bent portion on an outer side of the first circumferential direction. The circumferential outer first linear portion is shaped linearly along an insertion direction when the one end side of the connection member is inserted into the first connection passage. The second connection passage includes a circumferential outer second linear portion provided at a position of the second connection passage that faces the second bent portion on an outer side of the second circumferential direction. The circumferential outer second linear portion is shaped linearly along an insertion direction when the opposite end side of the connection member is inserted into the second connection passage.

According to the seventh exemplary embodiment, the connection member can be easily mounted in the first and second connection passages.

Eighth Exemplary Embodiment

In the power steering apparatus according to the seventh exemplary embodiment, the first curved portion and the circumferential outer first linear portion are formed by machining processing using a same tool. The second curved portion and the circumferential outer second linear portion are formed by machining processing using a same tool.

According to the eighth exemplary embodiment, the work efficiency of the processing can be improved.

Ninth Exemplary Embodiment

In the power steering apparatus according to the first exemplary embodiment, the first curved portion is formed into a circular arc shape in cross-section perpendicular to the first circumferential direction. The second curved portion is formed into a circular arc shape in cross-section perpendicular to the second circumferential direction.

According to the ninth exemplary embodiment, the nut can further reliably keep the thickness thereof sufficient compared to the formation of the cross-section into the quadrilateral shape.

Tenth Exemplary Embodiment

A tenth exemplary embodiment is provided as a method of manufacturing a power steering apparatus. The power steering apparatus includes a wheel turning shaft (a rack) configured to turn a turning target wheel by being axially displaced according to a rotation of a steering wheel, a wheel turning shaft-side ball screw groove provided on an outer peripheral side of the wheel turning shaft and having a helically grooved shape, a nut made from a metallic material, including a main body portion formed annularly so as to surround the wheel turning shaft, and provided rotatably relative to the wheel turning shaft, a nut-side ball screw groove provided on an inner peripheral side of the nut, having a helically grooved shape, and forming a helical ball circulation groove together with the wheel turning shaft-side ball screw groove, a plurality of balls provided movably in the ball circulation groove, a first connection passage provided in the nut and formed in such a manner that one end side of the first connection passage is opened on an outer peripheral surface of the nut and an opposite end side of the first connection passage is opened on an inner peripheral surface of the nut on one end side of the ball circulation groove, a second connection passage provided in the nut and formed in such a manner that one end side of the second connection passage is opened on the outer peripheral surface of the nut and an opposite end side of the second connection passage is opened on the inner peripheral surface of the nut on an opposite end side of the ball circulation groove, and a connection member having one end side and an opposite end side inserted in the first connection passage and the second connection passage, respectively. The connection member is configured as an annular member connecting the first connection passage and the second connection passage to each other so as to allow the plurality of balls to travel between a first passage-side and a second passage-side. The connection member includes a first bent portion provided between the one end side of the annular member and a generally intermediate portion and formed in such a manner that a travel direction of the plurality of balls transitions in a curved manner, and a second bent portion provided between the opposite end side and the generally intermediate portion and formed in such a manner that the travel direction of the plurality of balls transitions in a curved manner. The power steering apparatus further includes an electric motor configured to rotationally drive the nut and provide a steering force to the wheel turning shaft by a conversion of a rotation of the nut into an axial movement of the wheel turning shaft. The method includes forming, by machining processing, a first curved portion having such a curved shape that a space between the first curved portion and the first bent portion is equal to or smaller than a predetermined value at a position of the first connection passage that faces the first bent portion on an inner side of a first circumferential direction assuming that the first circumferential direction is a line along a bent direction of the first bent portion, and forming, by machining processing, a second curved portion having such a curved shape that a space between the second curved portion and the second bent portion is equal to or smaller than a predetermined value at a position of the second connection passage that faces the second bent portion on an inner side of a second circumferential direction assuming that the second circumferential direction is a line along a bent direction of the second bent portion.

According to the tenth exemplary embodiment, the first and second connection passages are each shaped into the curved shape in conformity with the curved shape of the connection member, which can both achieve the increase in the curvature radius of the bent portion of the connection member and keep the thickness of the nut sufficient. The increased curvature radius of the curved portion of the connection member allows the balls to smoothly travel, and the thickness of the nut kept sufficient enhances the strength of the nut.

Eleventh Exemplary Embodiment

The method of manufacturing the power steering apparatus according to the tenth exemplary embodiment further includes forming, by machining processing, a circumferential outer first linear portion on the first connection passage. The circumferential outer first linear portion is provided at a position of the first connection passage that faces the first bent portion on an outer side of the first circumferential direction, and is shaped linearly along an insertion direction when the one end side of the connection member is inserted into the first connection passage. The method further includes forming, by machining processing, a circumferential outer second linear portion on the second connection passage. The circumferential outer second linear portion is provided at a position of the second connection passage that faces the second bent portion on an outer side of the second circumferential direction, and is shaped linearly along an insertion direction when the opposite end side of the connection member is inserted into the second connection passage.

According to the eleventh exemplary embodiment, the connection member can be easily mounted in the first and second connection passages.

Twelfth Exemplary Embodiment

In the method of manufacturing the power steering apparatus according to the eleventh exemplary embodiment, the first curved portion and the circumferential outer first linear portion are formed by the machining processing using a same tool. The second curved portion and the circumferential outer second linear portion are formed by the machining processing using a same tool.

According to the twelfth exemplary embodiment, the work efficiency of the processing can be improved.

Thirteenth Exemplary Embodiment

In the method of manufacturing the power steering apparatus according to the twelfth exemplary embodiment, the first curved portion and the circumferential outer first linear portion are formed by the machining processing while the tool used to form the first curved portion and the circumferential outer first linear portion is rotated around a rotational axis kept in a generally constant direction. The second curved portion and the circumferential outer second linear portion are formed by the machining processing while the tool used to form the second curved portion and the circumferential outer second linear portion is rotated around a rotational axis kept in a generally constant direction.

According to the thirteenth exemplary embodiment, the work efficiency of the processing can be further improved.

Fourteenth Exemplary Embodiment

In the method of manufacturing the power steering apparatus according to the tenth exemplary embodiment, the first curved portion and the second curved portion are formed in such a manner that a curvature radius of the first bent portion is equal to or larger than a curvature radius of the first curved portion and a curvature radius of the second bent portion is equal to or larger than a curvature radius of the second curved portion.

According to the fourteenth exemplary embodiment, the respective interference contacts between the first and second bent portions and the first and second curved portions can be prevented or reduced.

Fifteenth Exemplary Embodiment

The method of manufacturing the power steering apparatus according to the fourteenth exemplary embodiment further includes forming a circumferential inner first linear portion provided on the opposite end side of the first connection passage with respect to the first curved portion and linearly connecting the first curved portion and the one end side of the ball circulation groove, and forming a circumferential inner second linear portion provided on the opposite end side of the second connection passage with respect to the second curved portion and linearly connecting the second curved portion and the opposite end side of the ball circulation groove.

According to the fifteenth exemplary embodiment, the ball circulation groove and each of the first and second curved portions can be smoothly connected to each other. The circumferential inner first linear portion and the circumferential inner second linear portion may be formed so as to generally coincide with the tangential directions of the ball circulation groove that pass through the one end and the opposite end of the ball circulation groove, respectively, which allows the balls to further smoothly travel.

Sixteenth Exemplary Embodiment

In the method of manufacturing the power steering apparatus according to the fifteenth exemplary embodiment, the connection member is formed so as to include a connection member-side first linear portion linearly formed between the first bent portion and the one end side of the connection member, and a connection member-side second linear portion linearly formed between the second bent portion and the opposite end side of the connection member. The first connection passage is formed in such a manner that a boundary between the first curved portion and the circumferential inner first linear portion is located on the opposite end side of the first connection passage with respect to a boundary between the first bent portion and the connection member-side linear portion of the connection member. The second connection passage is formed in such a manner that a boundary between the second curved portion and the circumferential inner second linear portion is located on the opposite end side of the second connection passage with respect to a boundary between the second bent portion and the connection member-side linear portion of the connection member.

According to the sixteenth exemplary embodiment, the respective interference contacts between the first and second bent portions and the first and second curved portions can be further effectively prevented or reduced.

Seventeenth Exemplary Embodiment

In the method of manufacturing the power steering apparatus according to the fifteenth exemplary embodiment, the first connection passage is formed in such a manner that a point on the first curved portion that is located a shortest distance away from a contact point between the nut-side ball screw groove and the plurality of balls is located on the opposite end side of the first connection passage with respect to a boundary between the first curved portion and the circumferential inner first linear portion. The second connection passage is formed in such a manner that a point on the second curved portion that is located a shortest distance away from the contact point between the nut-side ball screw groove and the plurality of balls is located on the opposite end side of the second connection passage with respect to a boundary between the second curved portion and the circumferential inner second linear portion.

The contact point between the nut-side ball screw groove and the balls is subject to a load on the nut, and a further strict requirement is imposed regarding the strength at a portion where a distance between this contact point and each of the first and second curved portions is minimized. According to the seventeenth exemplary embodiment, this point is formed on a deeper side than the region where each of the first and second curved portions is formed, which can eliminate or reduce the influence of the reduction in the thickness due to the formation of each of the first and second curved portions.

Eighteenth Exemplary Embodiment

In the method of manufacturing the power steering apparatus according to the fourteenth exemplary embodiment, the first curved portion is formed in such a manner that a center of the curvature radius of the first curved portion is located closer to a rotational axis of the nut than the nut-side ball screw groove is. The second curved portion is formed in such a manner that a center of the curvature radius of the second curved portion is located closer to the rotational axis of the nut than the nut-side ball screw groove is.

According to the eighteenth exemplary embodiment, the first and second curved portions can have sufficient curvature radii, and the first and second bent portions can have large curvature radii according thereto, which contributes to the smooth travel of the balls in the connection member.

Nineteenth Exemplary Embodiment

In the method of manufacturing the power steering apparatus according to the tenth exemplary embodiment, the first curved portion is formed into a circular arc shape in cross-section perpendicular to the first circumferential direction. The second curved portion is formed into a circular arc shape in cross-section perpendicular to the second circumferential direction.

According to the nineteenth exemplary embodiment, the nut can further reliably keep the thickness thereof sufficient compared to the formation of the cross-section into the quadrilateral shape.

This application claims priority to Japanese Patent Application No. 2014-036211 filed on Feb. 27, 2014. The entire disclosure of Japanese Patent Application No. 2014-036211 filed on Feb. 27, 2014 including the specification, the claims, the drawings, and the summary is incorporated herein by reference in its entirety.

REFERENCE SIGNS LIST 10 wheel turning shaft
11 wheel turning shaft-side ball screw groove
12 ball circulation groove
20 nut
20$a$ main body portion
20$e$ first connection passage
20$e$1 first curved portion
20$e$2 circumferential inner first linear portion
20$e$3 circumferential outer first linear portion
20$f$ second connection passage
20$f$1 second curved portion
20$f$2 circumferential inner second linear portion
20$f$3 circumferential outer first linear portion
22 ball
23 connection member
23$a$ intermediate portion
23$b$ first bent portion
23$c$ second bent portion
23$d$ connection member-side first linear portion
23$e$ connection member-side first linear portion

The invention claimed is:

1. A power steering apparatus comprising:
a wheel turning shaft configured to turn a turning target wheel by being axially displaced according to rotation of a steering wheel;
a wheel turning shaft-side ball screw groove provided on an outer peripheral side of the wheel turning shaft and having a helically grooved shape;
a nut made from metallic material, the nut including a main body portion formed annularly so as to surround the wheel turning shaft, the nut being provided rotatably relative to the wheel turning shaft;
a nut-side ball screw groove provided on an inner peripheral side of the nut, the nut-side ball screw groove having a helically grooved shape, the nut-side ball screw groove forming a helical ball circulation groove together with the wheel turning shaft-side ball screw groove;
a plurality of balls provided movably in the ball circulation groove;
a first connection passage provided in the nut and formed in such a manner that one end side of the first connection passage is opened on an outer peripheral surface of the nut and an opposite end side of the first connection passage is opened on an inner peripheral surface of the nut on one end side of the ball circulation groove;
a second connection passage provided in the nut and formed in such a manner that one end side of the second connection passage is opened on the outer peripheral surface of the nut and an opposite end side of the second connection passage is opened on the inner peripheral surface of the nut on an opposite end side of the ball circulation groove;

a connection member having one end side and an opposite end side inserted in the first connection passage and the second connection passage, respectively, the connection member being configured as an annular member connecting the first connection passage and the second connection passage to each other so as to allow the plurality of balls to travel between a first passage-side and a second passage-side, the connection member including a first bent portion provided between the one end side of the connection member and a generally intermediate portion and formed in such a manner that a travel direction of the plurality of balls transitions in a curved manner, and a second bent portion provided between the opposite end side and the generally intermediate portion and formed in such a manner that the travel direction of the plurality of balls transitions in a curved manner;

a first curved portion provided at a position of the first connection passage that faces the first bent portion on an inner side of the first bent portion, the first curved portion being formed into a curved shape in such a manner that a space between the first curved portion and the first bent portion is equal to or smaller than a predetermined value;

a second curved portion provided at a position of the second connection passage that faces the second bent portion on an inner side of the second bent portion, the second curved portion being formed into a curved shape in such a manner that a space between the second curved portion and the second bent portion is equal to or smaller than a predetermined value; and an electric motor configured to rotationally drive the nut, and provide a steering force to the wheel turning shaft by conversion of rotation of the nut into axial movement of the wheel turning shaft, wherein the first connection passage includes a circumferential inner first linear portion provided on the opposite end side of the first connection passage with respect to the first curved portion and linearly connecting the first curved portion and the one end side of the ball circulation groove, wherein the second connection passage includes a circumferential inner second linear portion provided on the opposite end side of the second connection passage with respect to the second curved portion and linearly connecting the second curved portion and the opposite end side of the ball circulation groove, wherein the first curved portion is formed in such a manner that a center of a curvature radius of the first curved portion is located closer to a rotational axis of the nut than the nut-side ball screw groove is, wherein the second curved portion is formed in such a manner that a center of a curvature radius of the second curved portion is located closer to the rotational axis of the nut than the nut-side ball screw groove is, wherein the generally intermediate portion of the connection member is linearly formed, wherein the connection member includes a connection member-side first linear portion linearly formed between the first bent portion and the one end side of the connection member, and a connection member-side second linear portion linearly formed between the second bent portion and the opposite end side of the connection member, wherein the first connection passage is formed in such a manner that a boundary between the first curved portion and the circumferential inner first linear portion is located on the opposite end side of the first connection passage with respect to a boundary between the first bent portion and the connection member-side first linear portion of the connection member, wherein the second connection passage is formed in such a manner that a boundary between the second curved portion and the circumferential inner second linear portion is located on the opposite end side of the second connection passage with respect to a boundary between the second bent portion and the connection member-side second linear portion of the connection member, and wherein the first curved portion, and a surface of the first bent portion, which surface faces the first curved portion, are spaced apart from each other.

2. The power steering apparatus according to claim 1, wherein the first curved portion and the second curved portion are formed in such a manner that a curvature radius of the first bent portion is equal to or larger than the curvature radius of the first curved portion and a curvature radius of the second bent portion is equal to or larger than the curvature radius of the second curved portion.

3. The power steering apparatus according to claim 1, wherein the first connection passage includes a circumferential outer first linear portion provided at a position of the first connection passage that faces the first bent portion on an outer side of the first bent portion, the circumferential outer first linear portion being shaped linearly along an insertion direction when the one end side of the connection member is inserted into the first connection passage, and wherein the second connection passage includes a circumferential outer second linear portion provided at a position of the second connection passage that faces the second bent portion on an outer side of the second bent portion, the circumferential outer second linear portion being shaped linearly along an insertion direction when the opposite end side of the connection member is inserted into the second connection passage.

4. The power steering apparatus according to claim 3, wherein the first curved portion and the circumferential outer first linear portion are formed by machining processing using a same tool, and wherein the second curved portion and the circumferential outer second linear portion are formed by machining processing using a same tool.

5. The power steering apparatus according to claim 1, wherein the first curved portion is formed into a circular arc shape in a cross-section perpendicular to a first circumferential direction along a bent direction of the first bent portion, and wherein the second curved portion is formed into a circular arc shape in a cross-section perpendicular to a second circumferential direction along a bent direction of the second bent portion.

6. A method of manufacturing a power steering apparatus, the power steering apparatus including a wheel turning shaft configured to turn a turning target wheel by being axially displaced according to rotation of a steering wheel, a wheel turning shaft-side ball screw groove provided on an outer peripheral side of the wheel turning shaft and having a helically grooved shape, a nut made from metallic material, the nut including a main body portion formed annularly so as to surround the wheel turning shaft, the nut being provided rotatably relative to the wheel turning shaft, a nut-side ball screw groove provided on an inner peripheral side of the nut, the nut-side ball screw groove having a helically grooved shape, the nut-side ball screw groove forming a helical ball circulation groove together with the wheel turning shaft-side ball screw groove, a plurality of balls provided movably in the ball circulation groove, a first connection passage provided in the nut and formed in such a manner that one end side of the first connection passage is opened on an outer peripheral surface of the nut and an opposite end side of the first connection passage is opened on an inner peripheral surface of the nut on one end side of the ball circulation groove, a second connection passage provided in the nut and formed in such a manner that one end side of the second connection passage is opened on the outer peripheral surface of the nut and an opposite end side of the second connection passage is opened on the inner peripheral surface of the nut on an opposite end side of the ball circulation groove, a connection member having one end side and an opposite end side inserted in the first connection passage and the second connection passage, respectively, the connection member being configured as an annular member connecting the first connection passage and the second connection passage to each other so as to allow the plurality of balls to travel between a first passage-side and a second passage-side, the connection member including a first bent portion provided between the one end side of the connection member and a generally intermediate portion and formed in such a manner that a travel direction of the plurality of balls transitions in a curved manner, and a second bent portion provided between the opposite end side and the generally intermediate portion and formed in such a manner that the travel direction of the plurality of balls transitions in a curved manner, and an electric motor configured to rotationally drive the nut, and provide a steering force to the wheel turning shaft by conversion of rotation of the nut into axial movement of the wheel turning shaft, the method comprising:

forming, by machining processing, a first curved portion having a curved shape such that a space between the first curved portion and the first bent portion is equal to or smaller than a predetermined value at a position of the first connection passage that faces the first bent portion on an inner side of the first bent portion;

forming, by machining processing, a second curved portion having a curved shape such that a space between the second curved portion and the second bent portion is equal to or smaller than a predetermined value at a position of the second connection passage that faces the second bent portion on an inner side of the second bent portion;

forming a circumferential inner first linear portion provided on the opposite end side of the first connection passage with respect to the first curved portion and linearly connecting the first curved portion and the one end side of the ball circulation groove; and forming a circumferential inner second linear portion provided on the opposite end side of the second connection passage with respect to the second curved portion and linearly connecting the second curved portion and the opposite end side of the ball circulation groove, wherein the first curved portion is formed in such a manner that a center of a curvature radius of the first curved portion is located closer to a rotational axis of the nut than the nut-side ball screw groove is, wherein the second curved portion is formed in such a manner that a center of a curvature radius of the second curved portion is located closer to the rotational axis of the nut than the nut-side ball screw groove is, and wherein the generally intermediate portion of the connection member is linearly formed, wherein the connection member is formed so as to include a connection member-side first linear portion linearly formed between the first bent portion and the one end side of the connection member, and a connection member-side second linear portion linearly formed between the second bent portion and the opposite end side of the connection member, wherein the first connection passage is formed in such a manner that a boundary between the first curved portion and the circumferential inner first linear portion is located on the opposite end side of the first connection passage with respect to a boundary between the first bent portion and the connection member-side first linear portion of the connection member, wherein the second connection passage is formed in such a manner that a boundary between the second curved portion and the circumferential inner second linear portion is located on the opposite end side of the second connection passage with respect to a boundary between the second bent portion and the connection member-side second linear portion of the connection member, and wherein the first curved portion is formed such that the first curved portion, and a surface of the first bent portion, which surface faces the first curved portion, are spaced apart from each other.

7. The method of manufacturing the power steering apparatus according to claim 6, further comprising:

forming, by machining processing, a circumferential outer first linear portion on the first connection passage, the circumferential outer first linear portion being provided at a position of the first connection passage that faces the first bent portion on an outer side of the first bent portion, the circumferential outer first linear portion being shaped linearly along an insertion direction when the one end side of the connection member is inserted into the first connection passage;

forming, by machining processing, a circumferential outer second linear portion on the second connection passage, the circumferential outer second linear portion being provided at a position of the second connection passage that faces the second bent portion on an outer side of the second bent portion, the circumferential outer second linear portion being shaped linearly along an insertion direction when the opposite end side of the connection member is inserted into the second connection passage.

8. The method of manufacturing the power steering apparatus according to claim 7, wherein the first curved portion and the circumferential outer first linear portion are formed by the machining processing using a same tool, and wherein the second curved portion and the circumferential outer second linear portion are formed by the machining processing using a same tool.

9. The method of manufacturing the power steering apparatus according to claim 8, wherein the first curved portion and the circumferential outer first linear portion are formed by the machining processing while the tool used to form the first curved portion and the circumferential outer first linear portion is rotated around a rotational axis kept in a generally constant direction, and wherein the second curved portion and the circumferential outer second linear portion are formed by the machining processing while the tool used to form the second curved portion and the circumferential outer second linear portion is rotated around a rotational axis kept in a generally constant direction.

10. The method of manufacturing the power steering apparatus according to claim 6, wherein the first curved portion and the second curved portion are formed in such a manner that a curvature radius of the first bent portion is equal to or larger than the curvature radius of the first curved portion and a curvature radius of the second bent portion is equal to or larger than the curvature radius of the second curved portion.

11. The method of manufacturing the power steering apparatus according to claim 6, wherein the first curved portion is formed into a circular arc shape in a cross-section perpendicular to a first circumferential direction along a bent direction of the first bent portion, and wherein the second curved portion is formed into a circular arc shape in a cross-section perpendicular to a second circumferential direction along a bent direction of the second bent portion.

* * * * *